US010458644B2

(12) United States Patent
Ansaldo-Swain et al.

(10) Patent No.: US 10,458,644 B2
(45) Date of Patent: Oct. 29, 2019

(54) FLOATING GRID ARRANGEMENT TO SUPPORT AND POSITION DECORATIVE ELEMENTS

(71) Applicant: AMCS Consulting, LLC, Medford, NJ (US)

(72) Inventors: Anne-Marie Ansaldo-Swain, Medford, NJ (US); Curtis Swain, Medford, NJ (US); Philip John Blyskal, Princeton, NJ (US); James Matthew Wittes, Princeton, NJ (US)

(73) Assignee: AMCS CONSULTING, LLC, Medford, NJ (US)

( * ) Notice: Subject to any disclaimer, the term of this patent is extended or adjusted under 35 U.S.C. 154(b) by 404 days.

(21) Appl. No.: 15/245,623

(22) Filed: Aug. 24, 2016

(65) Prior Publication Data
US 2017/0057696 A1 Mar. 2, 2017

Related U.S. Application Data

(60) Provisional application No. 62/210,478, filed on Aug. 27, 2015.

(51) Int. Cl.
B65D 25/20 (2006.01)
F21V 35/00 (2006.01)
(Continued)

(52) U.S. Cl.
CPC .............. F21V 35/00 (2013.01); A01G 5/00 (2013.01); A01G 31/00 (2013.01); A01G 31/02 (2013.01);
(Continued)

(58) Field of Classification Search
CPC ...... B65D 25/22; B65D 25/24; B65D 81/365; B65D 2203/12; B65D 2203/00;
(Continued)

(56) References Cited

U.S. PATENT DOCUMENTS 1,188,198 A 6/1916 Oshima
2,531,562 A 11/1950 Eve
(Continued)

FOREIGN PATENT DOCUMENTS

| JP | 1136122 A | 2/1999 |
| WO | 2005110167 A1 | 11/2005 |
| WO | 2014197517 A1 | 12/2014 |

OTHER PUBLICATIONS

Adminkak "Flower vase arrangement" kianaa.com, Mar 2, 2014 http://kianaa.com/diy/arrangment/flower-vase-arrangement/ Discloses the use of "Tape to make a grid on wide open bowls and vases. The grid makes it easier to decorate flowers".

(Continued)

Primary Examiner — Anthony D Stashick
Assistant Examiner — Onekki P Jolly
(74) Attorney, Agent, or Firm — Fox Rothschild LLP

(57) ABSTRACT

A plastic grid or framework arrangement is used to support and position a series of bowls that hold flower arrangements, candles, letters, and other decorative elements. This grid is deployable in water fountains, indoor and outdoor pools, and other small bodies of water during festive occasions or for longer term decorative display. A special feature of this invention is that the grid itself does not float and is positioned below the surface of the water, and thus is not readily visible. Buoyancy is provided at the hubs that form nodes in the grid. The hubs also support floating bowls containing various decorative elements. The resulting effect is that the various decorative elements appear to be floating on the surface while the sub-surface grid structure maintains their relative positioning, keeping the bowls from clumping together at the edges or in the corners of the pool or fountain. The framework can take the form of a grid or ring or other shapes and can be assembled quickly from a kit of compo- (Continued)

nents and can be easily dis-assembled and stored for future use.

20 Claims, 33 Drawing Sheets

(51) Int. Cl.
  *A01G 5/00* (2006.01)
  *A01G 31/00* (2018.01)
  *A01G 31/02* (2006.01)
  *F21W 121/00* (2006.01)
(52) U.S. Cl.
  CPC ........ *F21W 2121/00* (2013.01); *Y02P 60/216* (2015.11)
(58) Field of Classification Search
  CPC ................... B65D 5/425; B65D 2251/06; B65D 21/0201; B65D 21/0204; B65D 21/0202; B65D 21/02; A47G 2200/02; F25D 2323/062; F21V 35/00; B63B 22/24; B63B 22/00
  USPC ..... 220/376, 628, 630, 636, 560, 23.4, 23.2, 220/23.83, 737; 206/457; 441/32, 1
  See application file for complete search history.

(56) References Cited

U.S. PATENT DOCUMENTS

| | | | |
|---|---|---|---|
| 3,089,155 A | 5/1963 | Bengtson | |
| 4,588,618 A * | 5/1986 | Wolfe | A41G 1/00 119/253 |
| 4,660,893 A * | 4/1987 | Huntzinger | B60B 7/0006 301/37.41 |
| 5,228,229 A * | 7/1993 | Lindgren | A01G 9/028 108/24 |
| 5,722,347 A | 3/1998 | Tominaga et al. | |
| 5,758,452 A | 6/1998 | Matteucci et al. | |
| 5,934,796 A | 8/1999 | Quereau | |
| 6,014,838 A | 1/2000 | Asher | |
| 6,025,042 A | 2/2000 | Kligman et al. | |
| 6,220,718 B1 | 4/2001 | Burgess | |
| 6,751,903 B2 * | 6/2004 | Shryock | A01G 9/00 47/59 R |
| 6,843,021 B1 * | 1/2005 | Huang | A01G 9/00 47/60 |
| 7,000,347 B2 | 2/2006 | Roskin | |
| 7,406,798 B2 | 8/2008 | Barrett | |
| 7,975,430 B2 * | 7/2011 | Scott | A01G 31/02 211/80 |
| 8,132,364 B2 * | 3/2012 | Kania | B63B 35/34 114/267 |
| 8,555,547 B2 * | 10/2013 | Hashimoto | A01G 9/045 47/79 |
| 8,889,006 B2 * | 11/2014 | Lassovsky | C02F 3/327 210/150 |
| 9,033,326 B1 | 5/2015 | Smith | |
| 9,579,834 B2 * | 2/2017 | Delgado | C02F 3/32 |
| 9,756,792 B2 * | 9/2017 | Miller | A01G 9/02 |
| 2002/0184818 A1 | 12/2002 | Roskin | |
| 2005/0274073 A1 * | 12/2005 | Brooke | A01G 9/028 47/59 R |
| 2007/0107117 A1 | 5/2007 | Casolco | |
| 2007/0137100 A1 | 6/2007 | Beeman et al. | |
| 2008/0230010 A1 | 9/2008 | Buck | |
| 2012/0174480 A1 | 7/2012 | Riesco Prieto et al. | |
| 2014/0202954 A1 * | 7/2014 | Lassovsky | C02F 3/327 210/602 |
| 2015/0027047 A1 | 1/2015 | Roberts | |
| 2015/0041376 A1 * | 2/2015 | Fulford | C02F 3/103 210/143 |
| 2015/0359309 A1 * | 12/2015 | Kim | A45D 8/20 132/277 |
| 2016/0270303 A1 * | 9/2016 | Cooley | A01G 9/0295 |

OTHER PUBLICATIONS

1Man1Garage, "Floating Pavilion for Outdoor Party Lighting in a Pool or Pond. Decorate the large platform to suit your needs and Decor," Etsy, etsy.com, accessed: Jul. 2016. https://www.etsy.com/listing/195649848/floating-pavilion-for-outdoor-party Discloses "A solid foam core that keeps the wood shell able to ride out a gentle roll of waves, underneath is an anchor point hidden from view to tether the platform to each other, or solid ground.".

* cited by examiner

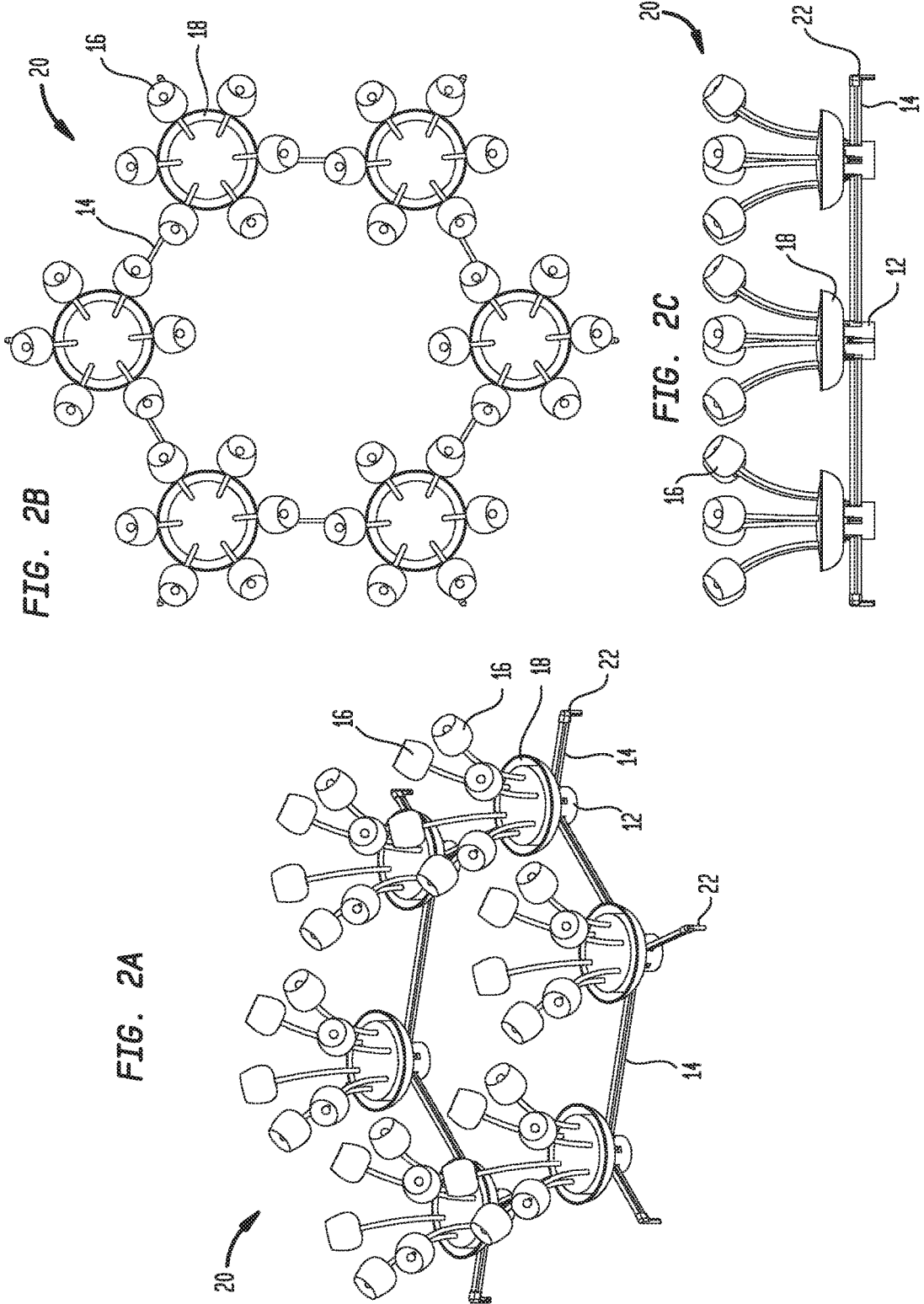

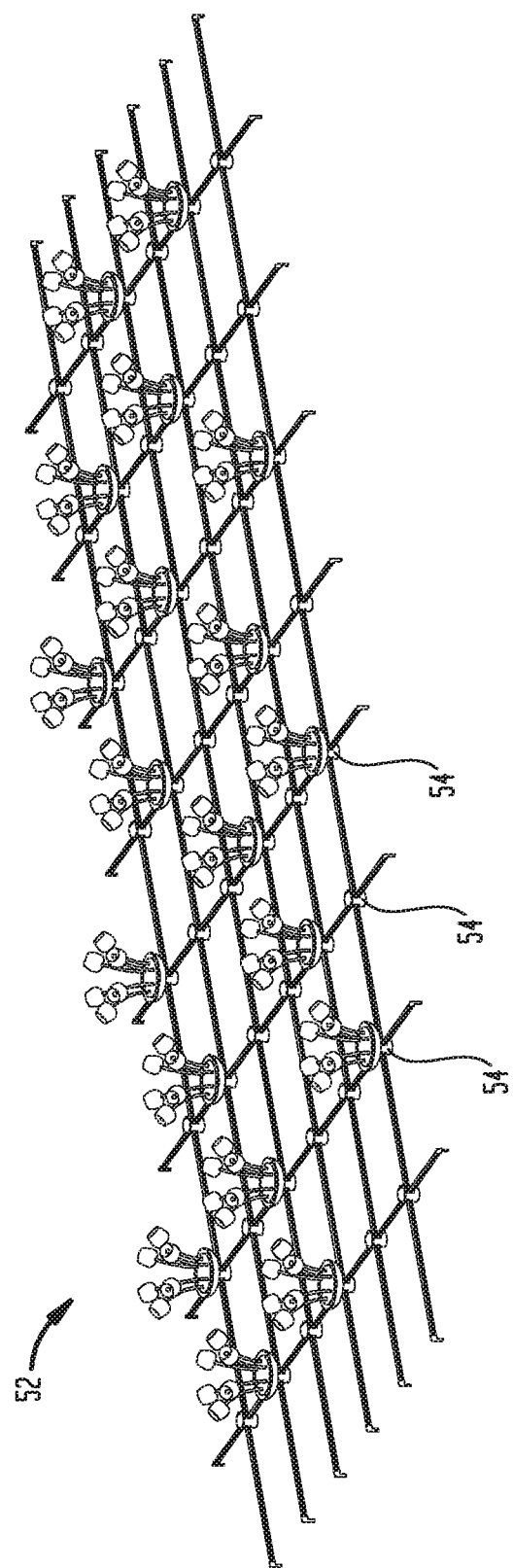

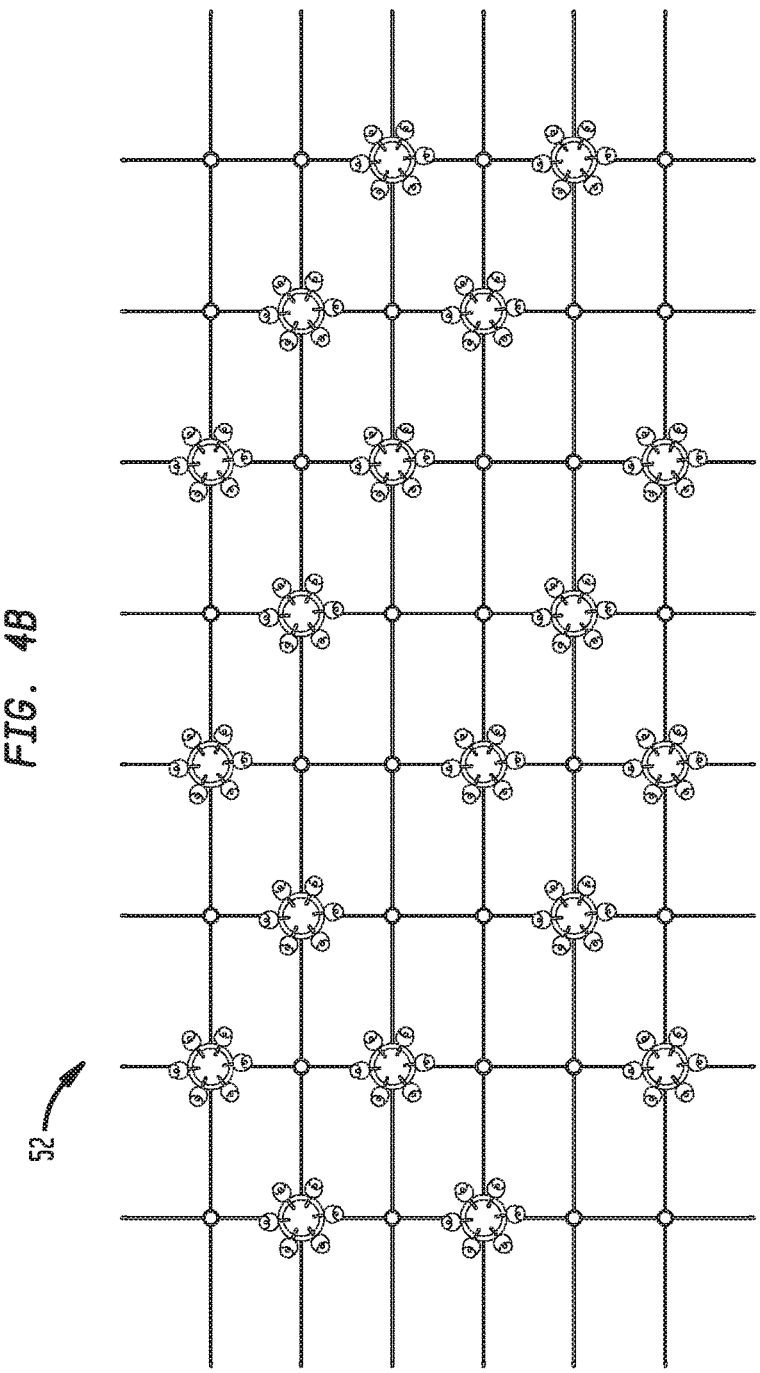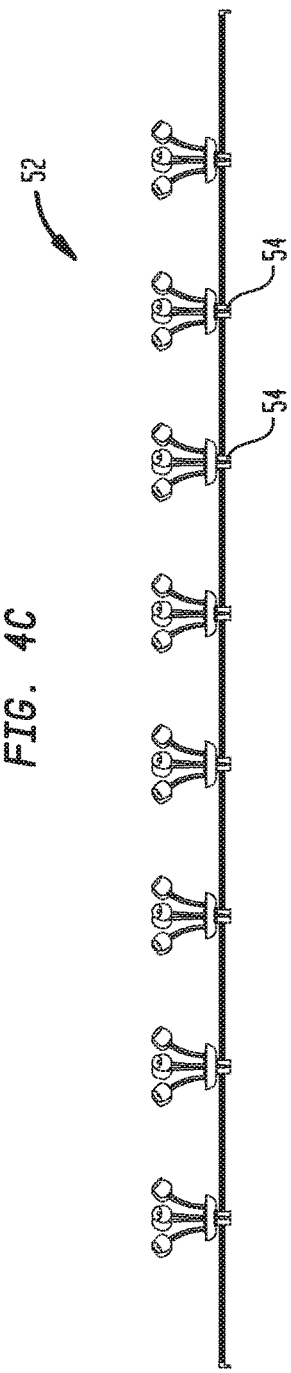

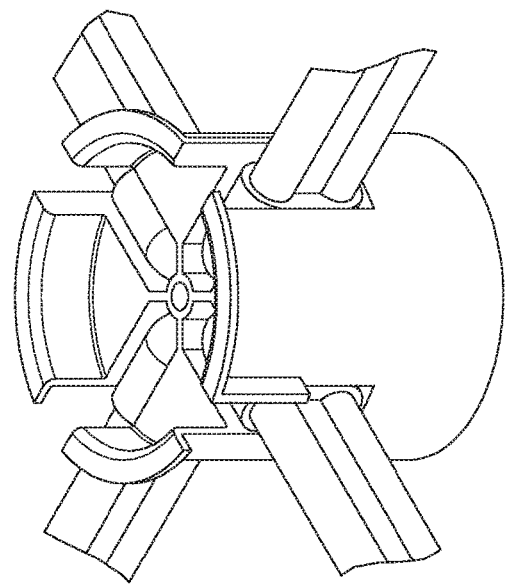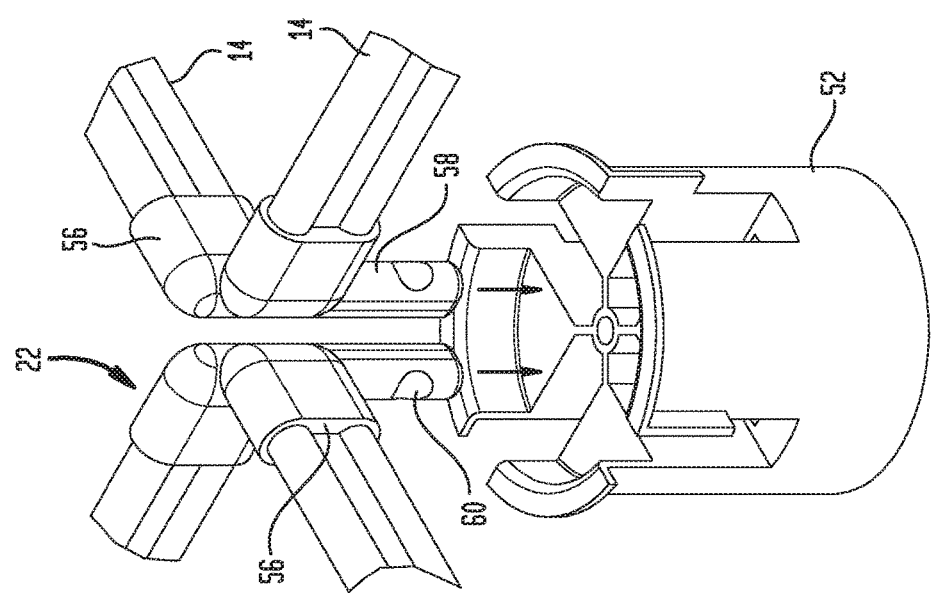

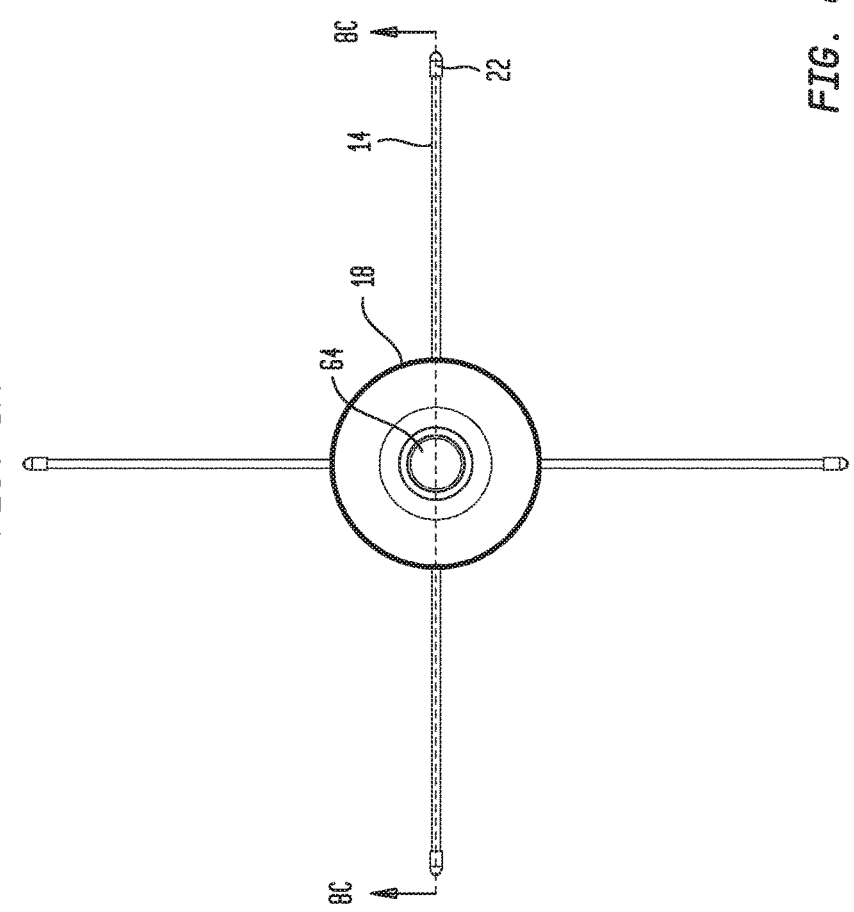

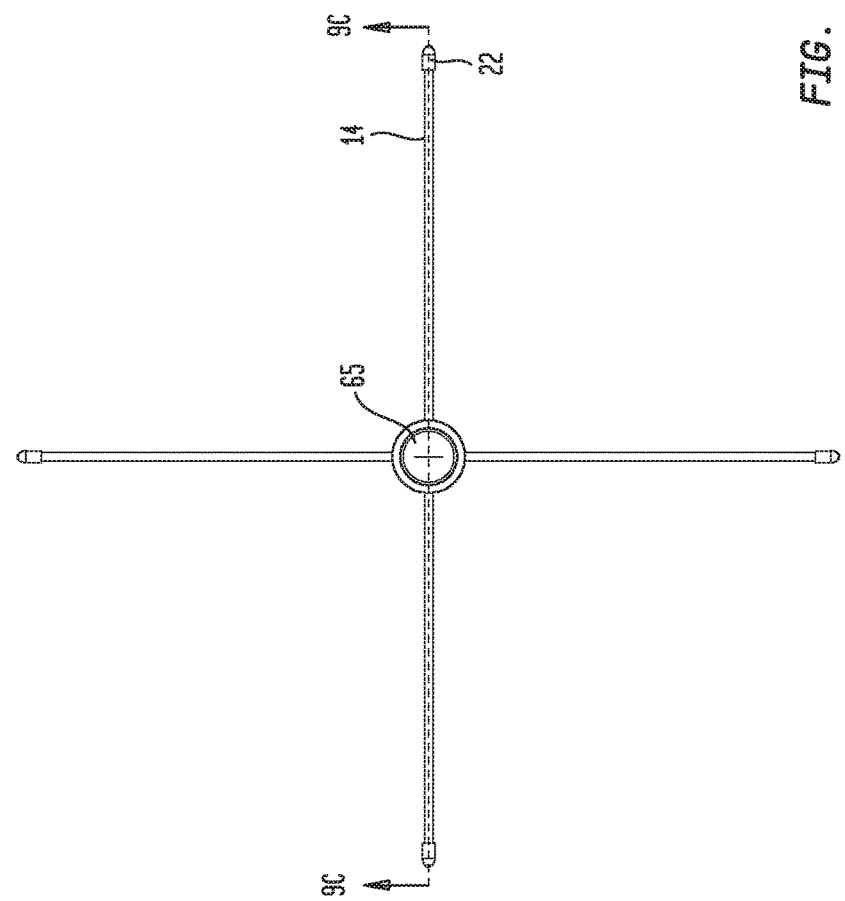

FIG. 13C
FIG. 13D
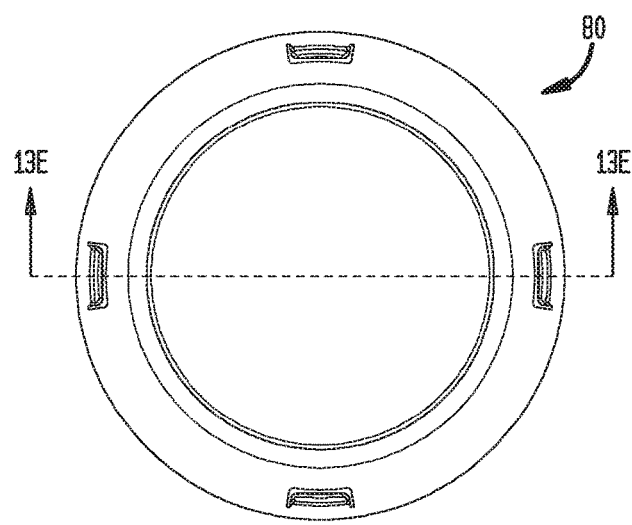
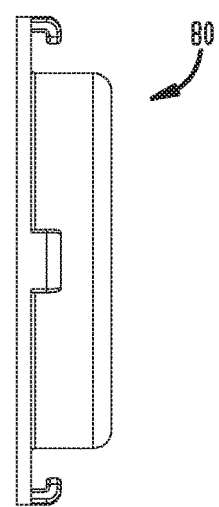
FIG. 13E
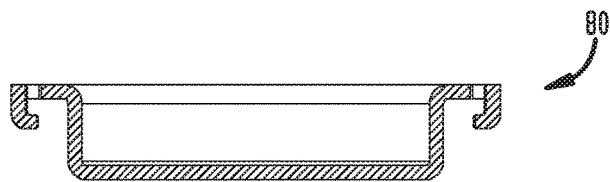

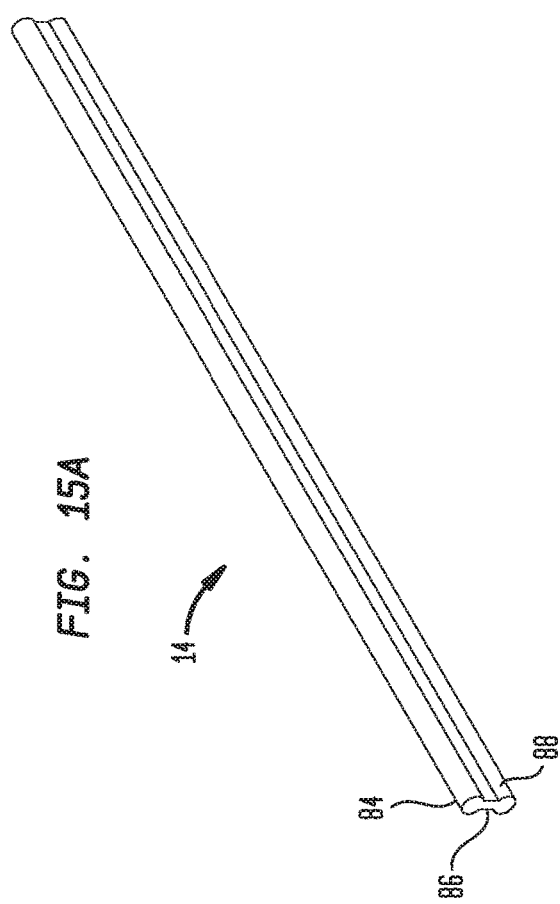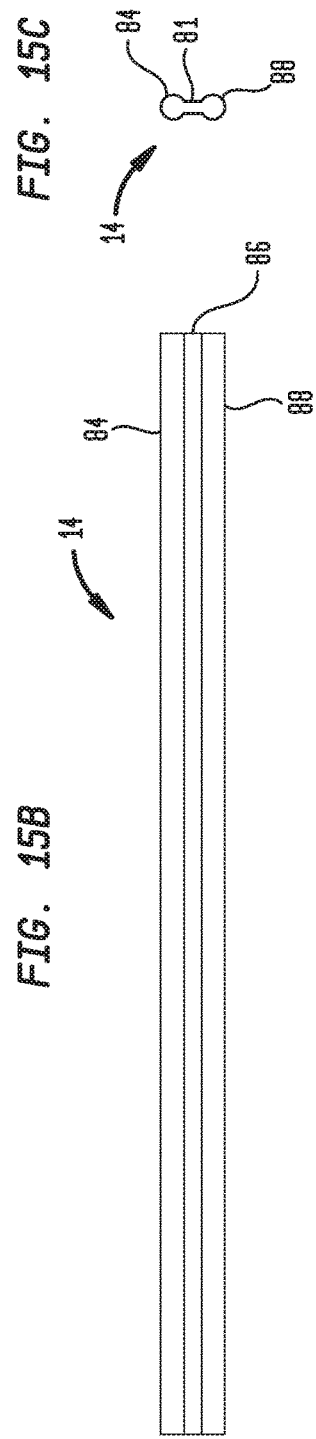

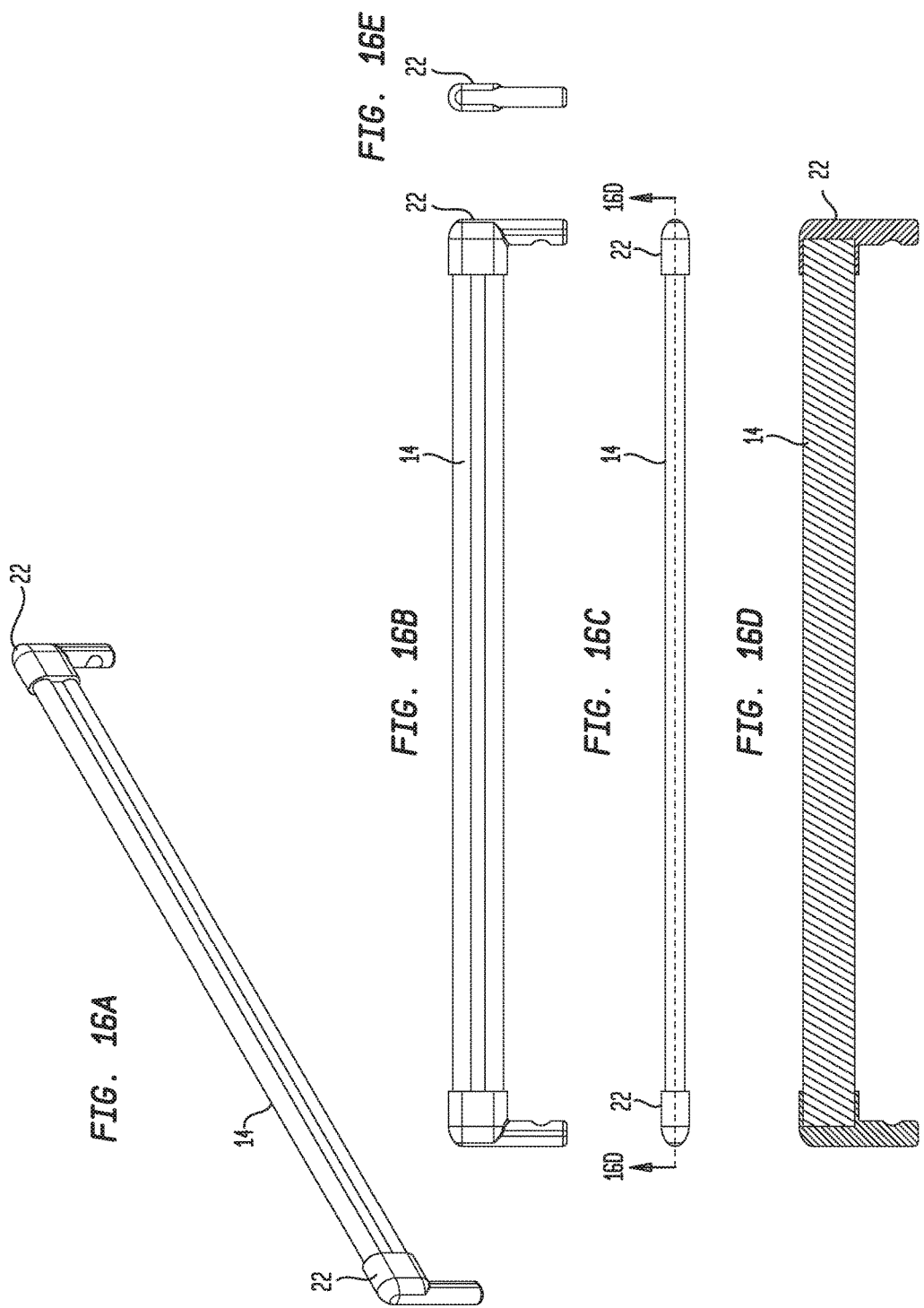

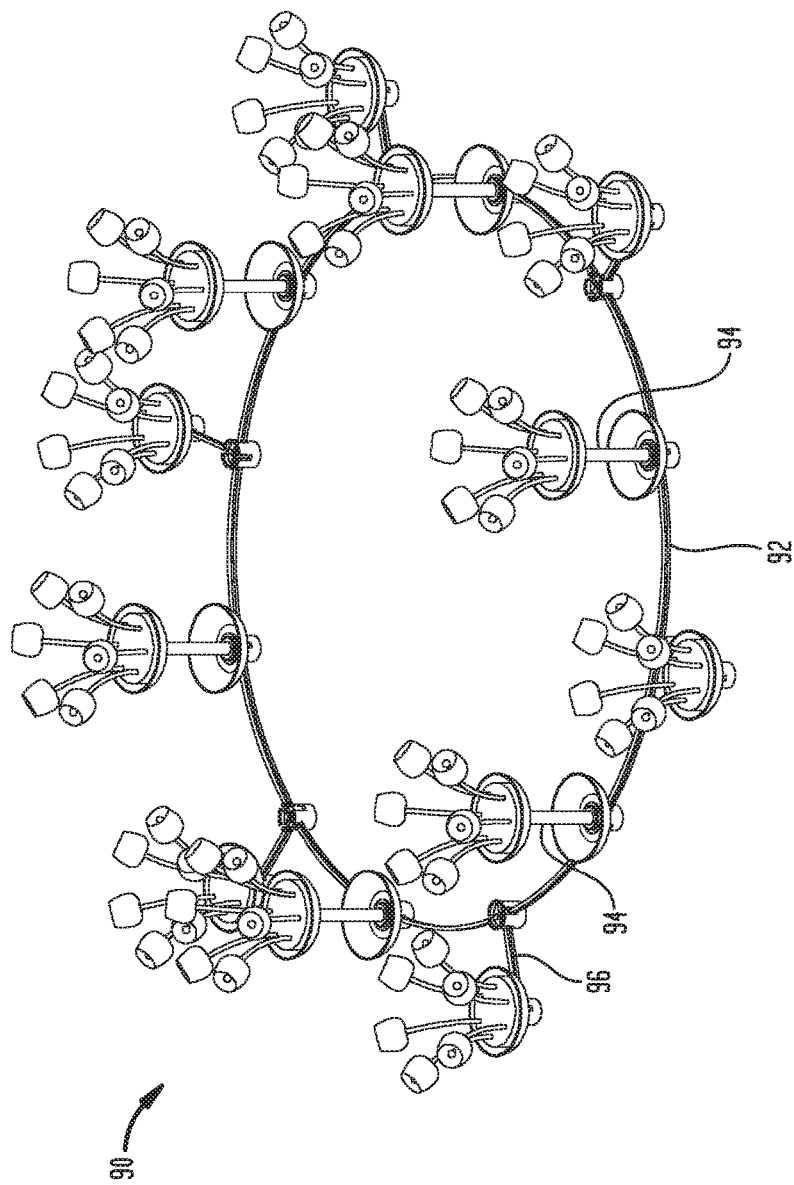

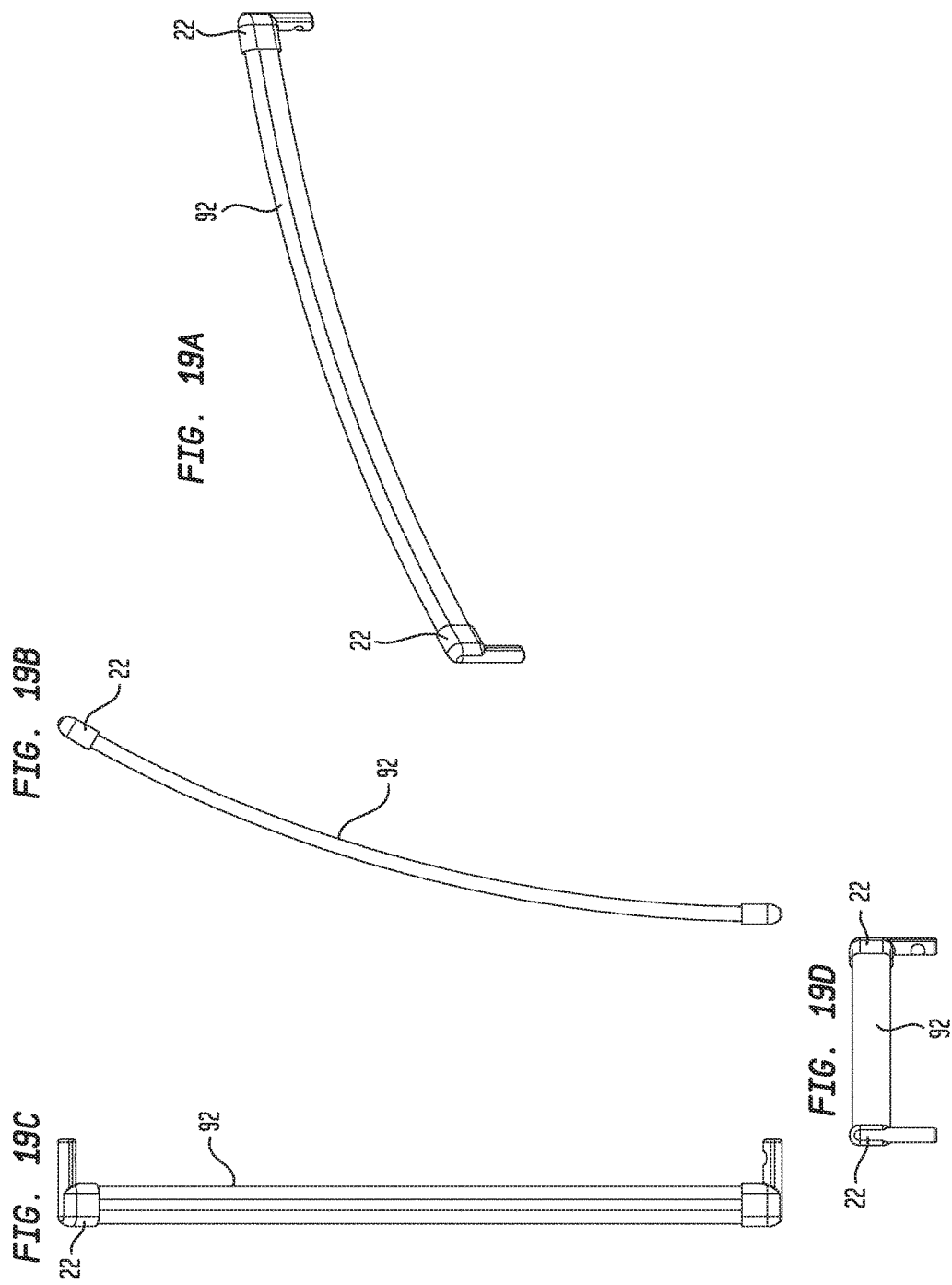

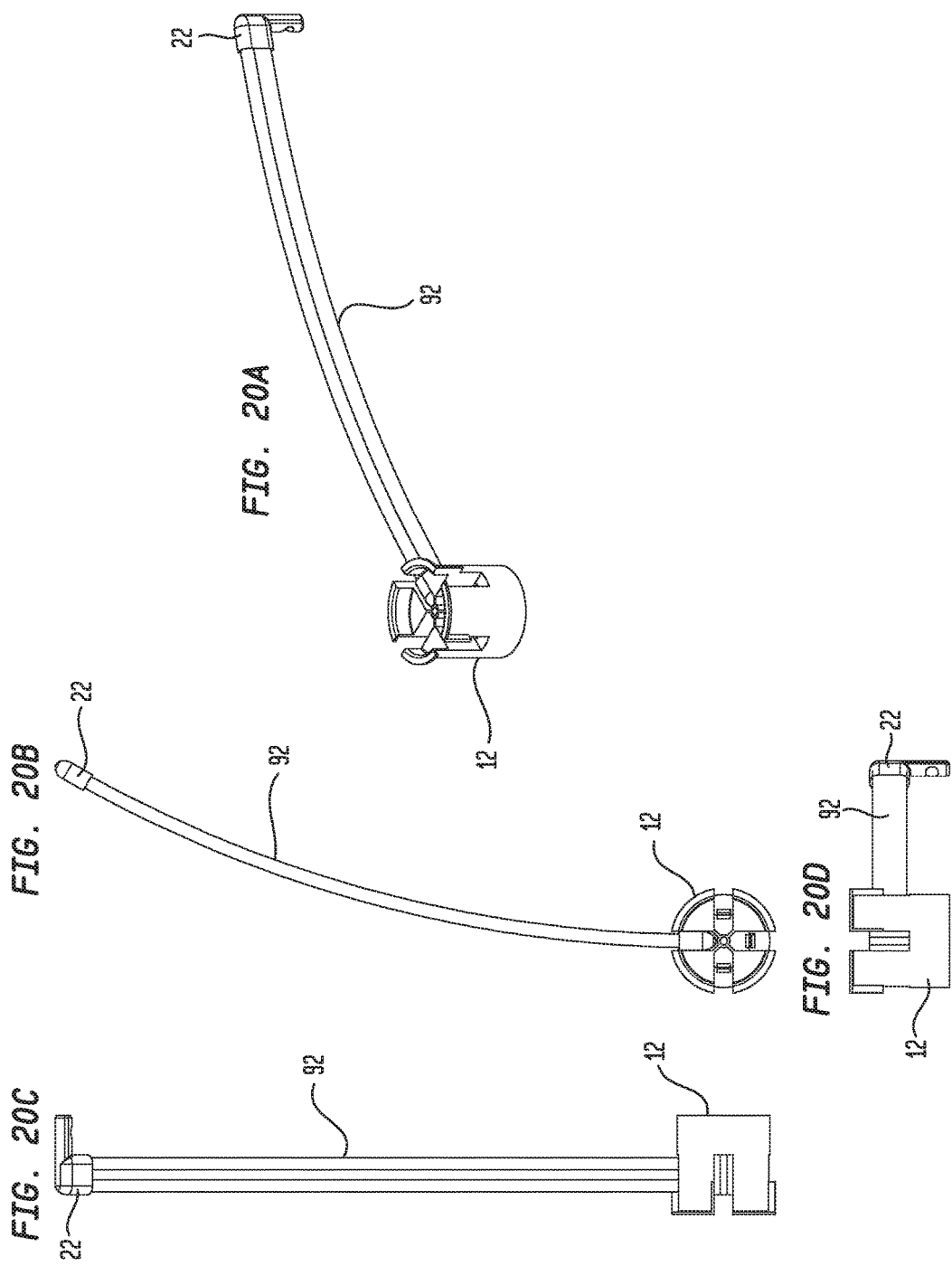

FLOATING GRID ARRANGEMENT TO SUPPORT AND POSITION DECORATIVE ELEMENTS

CROSS REFERENCE TO RELATED INVENTIONS

This application claims the priority of U.S. provisional patent application Ser. No. 62/210,478 filed Aug. 27, 2015 and entitled "FLOATING FLOWER HOLDER" by Anne Marie Swain and Curtis Swain the entire contents of which are hereby incorporated in total by reference.

BACKGROUND OF THE INVENTION

Field of the Invention

The invention relates to a floating grid that can be assembled to support decorative elements such as flowers or candles in a small body of water.

Description of the Prior Art

The prior art discloses various floating devices that support decorative elements such as flowers and candles for use in small bodies of water such as swimming pools or ponds. The following U.S. and foreign patent references are typical.

U.S. Pat. No. 6,220,718 discloses a floating candle device comprising: a candle enclosure, a candle base having upper and lower portions, a grommet dimensioned and configured to fit into said opening in said lower portion of said candle base, wherein said floating candle device is arranged with other floating candle devices into letters and shapes (FIGS. 1-6; Column 7, Lines 67-69; Column 8, Lines 1-4; Claims 7-11).

U.S. Pat. No. 6,025,042 discloses an artificial lily pad made with polyester fabric flower petals, molded polypropylene or polyethylene stamens and stigmata, ethylene vinyl acetate leaves, polystyrene foam pads, and a bottom anchor ring. An anchor weight is attached to the bottom anchor ring by a monofilament nylon line which is colorless in water (FIGS. 1-3; Column 2, Lines 49-58; Claim 1).

2007/0107117 discloses a fountain kit for outfitting a swimming pool that comprises a water fountain assembly and a water pump assembly, including a plurality of fountain water outlets interconnected by a common conduit, which common conduit and which water outlets are mountable in adjacency to an upper pool periphery (FIGS. 1-8; Paragraphs [0042]-[0046]; Claims 16-21).

WO 2014197517A1 discloses a water purification apparatus comprising injection moulded floating non-toxic, biodegradable, and recyclable polymer planar structures (claim 2; FIG. 4).

2007/0137100 discloses a floatable plant cultivation system (FIGS. 2 and 3).

U.S. Pat. No. 6,014,838 discloses a floatable unit for displaying foliage on ponds (FIGS. 2 and 6).

The following patents show other floating plant structures of possible relevance: U.S. Pat. No. 6,751,903; 2012/0174480 A1; and, 2008/0230010 A1. In addition, U.S. Pat. No. 1,188,198 discloses a floating plant support system for artificial flowers.

The following non-patent literature articles describe structure of possible relevance.

Adminkak "Flower vase arrangement" kianaa.com, Mar. 2, 2014 http://kianaa.com/diy/arrangment/flower-vase-arrangement/ discloses the use of "tape to make a grid on wide open bowls and vases. The grid makes it easier to decorate flowers."

1Man1Garage, "Floating Pavilion for Outdoor Party Lighting in a Pool or Pond. Decorate the large platform to suit your needs and Decor," Etsy.com, accessed: July 2016. https://www.etsy.com/listing/195649848/floating-pavilion-for-outdoor-party discloses "a solid foam core that keeps the wood shell able to ride out a gentle roll of waves, underneath is an anchor point hidden from view to tether the platform to each other, or solid ground."

The following U.S. patent references may also be relevant: U.S. Pat. Nos. 9,033,326, 7,406,798, 7,000,347, 5,934,796, 5,758,452, 5,722,347, 4,588,618, 3,089,155, 2,531,562, 2015/0027047, 2002/0184818.

The following foreign patent references may also be relevant:
WO 2005110167A1 JPH 1136122A It was in the context of the above priori art that the present invention arose.

SUMMARY OF THE INVENTION

A plastic grid or framework arrangement is used to support and position a series of bowls that hold flower arrangements, candles, letters, and other decorative elements. The grid is deployable in water fountains, indoor and outdoor pools, ponds, and other small bodies of water during festive occasions or for longer term decorative display. An important feature of this product is that the grid itself does not float and is positioned below the surface of the water, and thus is not readily visible. Buoyancy is provided at the hubs that form nodes in the grid. The hubs also support floating bowls having a sealed air chamber, according to the preferred embodiment, and containing various decorative elements. Another possible alternative embodiment is a bowl without bottom slots and without a float chamber. The resulting effect is that the decorative elements appear to be floating on the surface while the sub-surface grid structure maintains their relative positioning, keeping the bowls from clumping together at the edges or in the corners of the pool or fountain.

The invention can be assembled quickly from a kit of standardized components and can be quickly dis-assembled and stored for future use. The spokes that radiate from each of the hubs include an end cap that can be easily snapped into position on the hubs when the apparatus is assembled. The underlying floating framework can take several forms including a grid or a ring and may also include horizontal and vertical extensions for extending the decorative elements in a plane horizontal or vertical to the plane of the framework. When the user is finished with the display it is easily disassembled by pulling the spoke end caps out of the hubs and unsnapping them from the retention springs securely held in one of a plurality of pockets in each hub. After disassembly, the entire set of components can be stored in a compact box or bag and saved for reuse at a subsequent event.

The invention may be more fully understood by reference to the following drawings.

BRIEF DESCRIPTION OF THE DRAWINGS

FIGS. 2A, 2B and 2C show an alternative framework arranged in the form of a ring.

FIGS. 4A, 4B and 4C show a square grid framework for supporting decorative flower holders using hubs that have four spoke engaging pockets according to another alternative embodiment of the invention.

FIGS. 6A and 6B illustrates the manner in which the spoke end caps snap into and engage the retention springs in the pockets of a four pocket hub.

FIGS. 8A, 8B and 8C illustrate how a decorative element support bowl is attached to a hub and how the spokes radiate from the hub.

FIGS. 9A, 9B and 9C illustrate the hub and spoke frame arrangement of FIGS. 8A-8C with the decorative element support bowl removed and replaced by the float subassembly visible above the hub.

FIGS. 13A, 13B, 13C, 13D and 13E show different views of an float base.

FIGS. 15A, 15B and 15C illustrate a typical spoke.

FIGS. 16A, 16B, 16C, 16D and 16E illustrate a spoke such as seen in FIGS. 15A-15C with end caps attached.

FIGS. 18A, 18B and 18C illustrate an embodiment of the invention which includes vertical and horizontal extenders for the decorative element holding bowls.

FIGS. 19A, 19B, 19C and 19D illustrate an alternative embodiment in which the spokes are curved.

FIGS. 20A, 20B, 20C and 20D illustrate the manner in which a curved spoke of FIGS. 19A-19D engages a hub.

DETAILED DESCRIPTION OF THE INVENTION

During the course of this disclosure like numbers will be used to identify like elements according the different views of the invention.

Figure 1A:
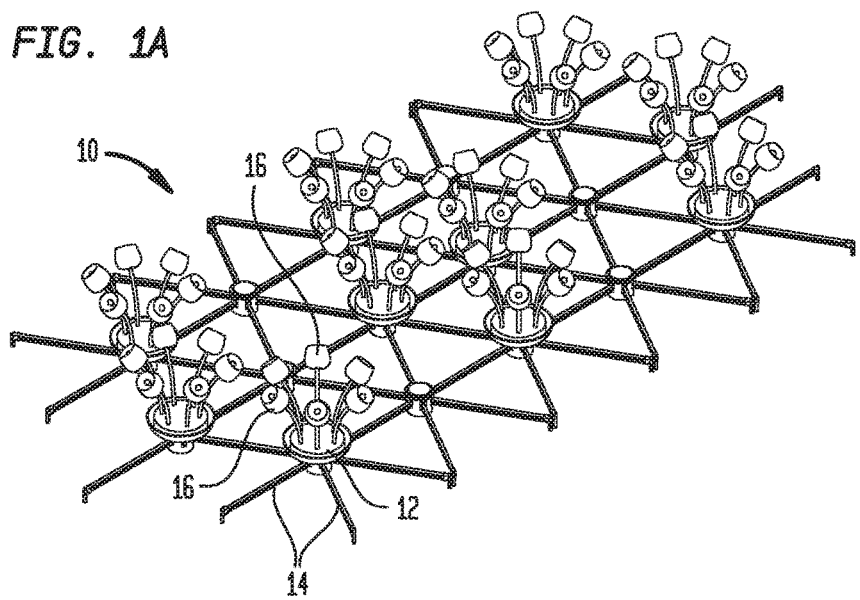
FIGS. 1A, 1B and 1C show a triangular grid framework for supporting decorative flower holders using hubs that have six spoke engaging pockets according to the preferred embodiment of the invention.
Figure 1B:
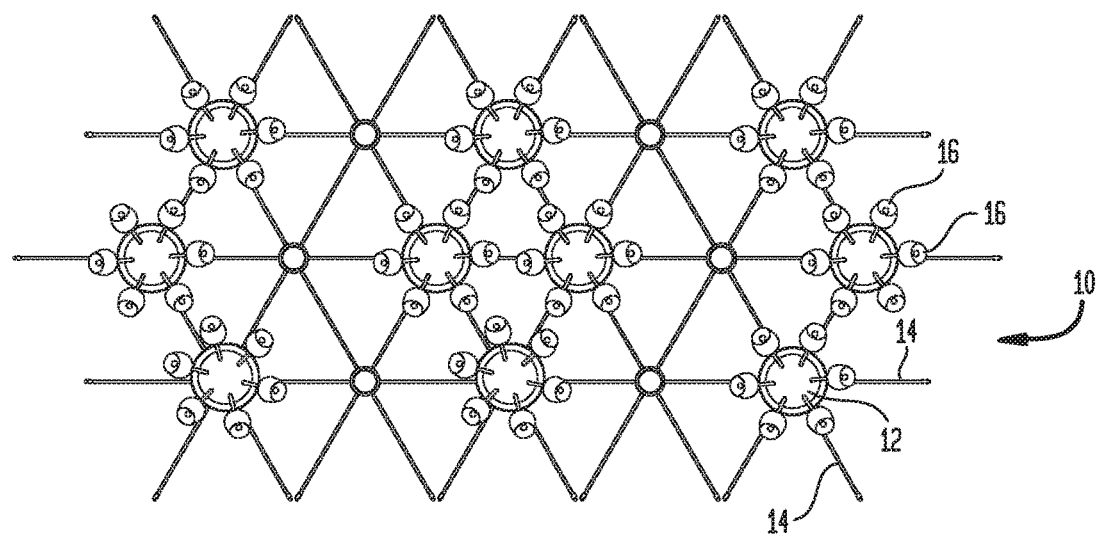
Figure 1C:
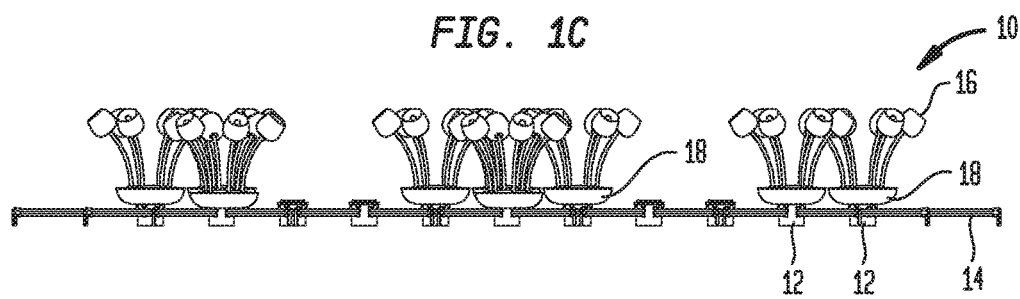

FIGS. 1A-1C show a triangular grid framework for supporting decorative flower holder bowls 18 using hubs 12 that have six spoke engaging pockets 32 according to the preferred embodiment 10 of the invention. The bowls 18 support flowers 16, or candles, or other decorative objects. Spokes 14 connect to the hubs 12 in a series of repeating patterns suggestive of triangles.

FIGS. 2A-2C show an alternative framework arranged in the form of a ring 20.

Figure 3A:
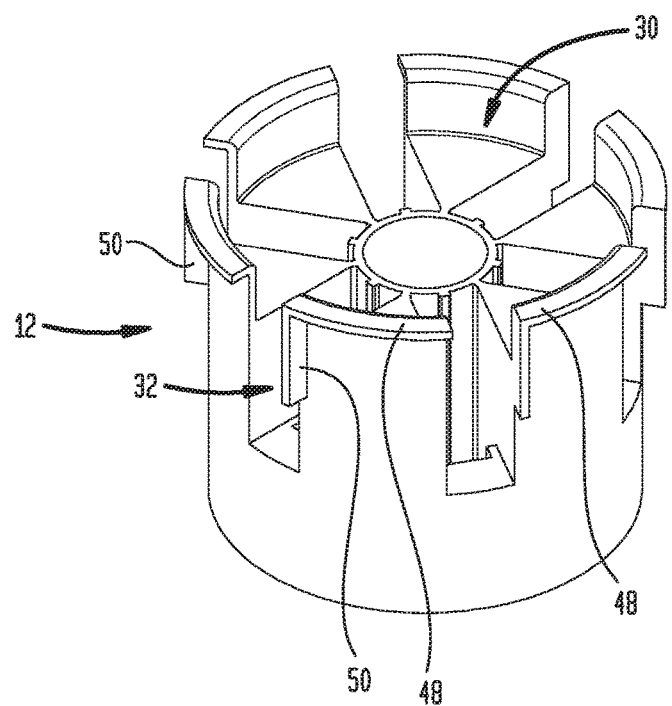
FIGS. 3A, 3B, 3C, 3D and 3E illustrate details of a six pocket hub and further indicating how the spoke retention springs are inserted into each hub pocket.
Figure 3B:
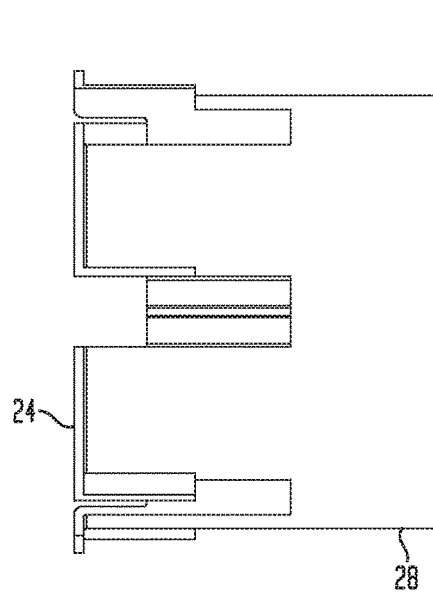
Figure 3C:
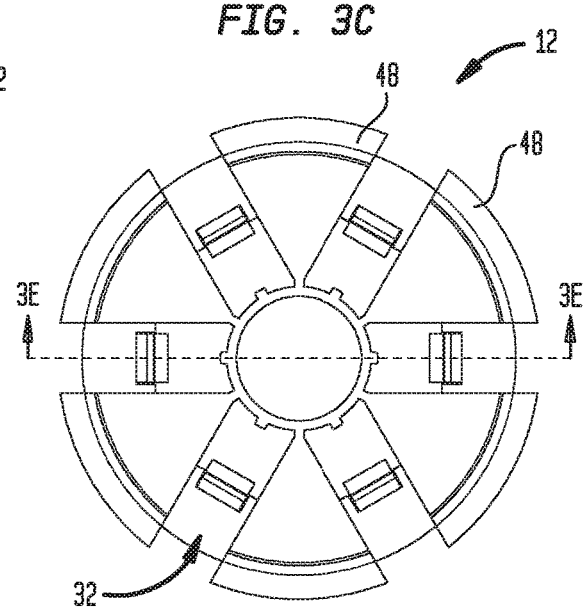
Figure 3D:
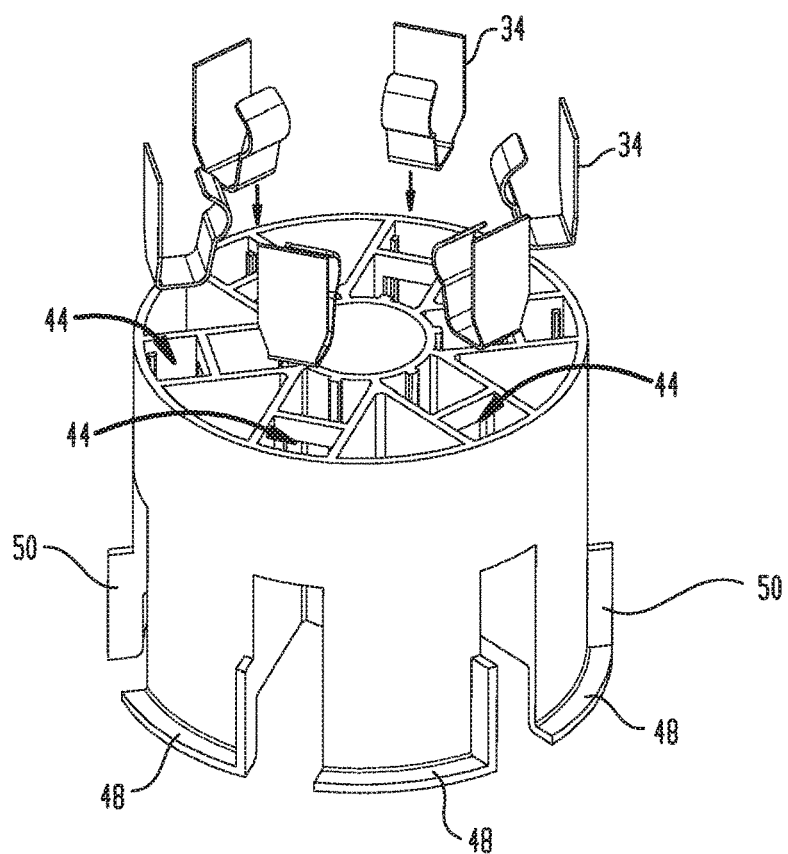
Figure 3E:
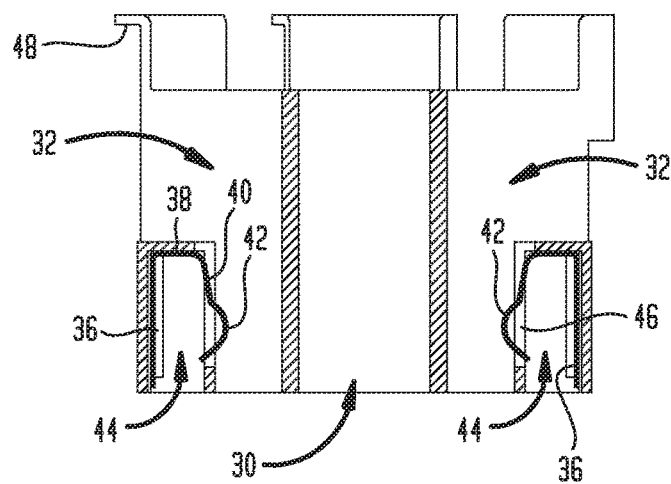
Figure 5A:
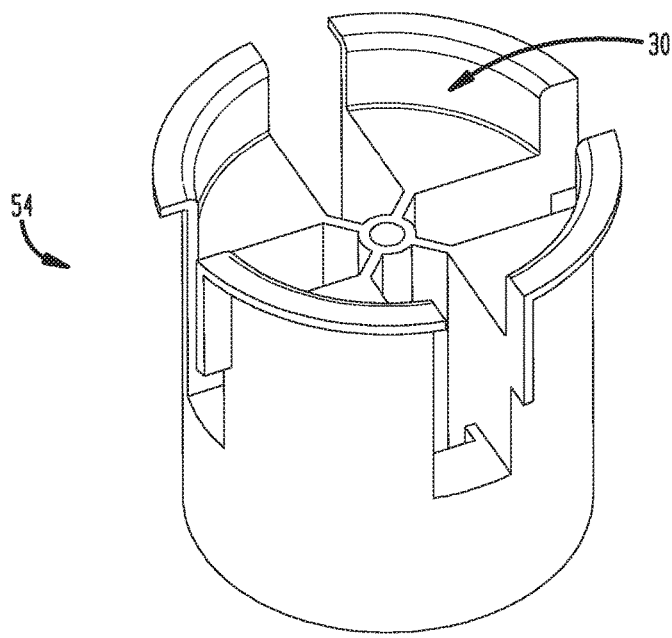
FIGS. 5A, 5B, 5C, 5D, 5E, 5F and 5G illustrate details of a four pocket hub and further indicating how the spoke retention springs are inserted into each hub pocket.
Figure 5B:
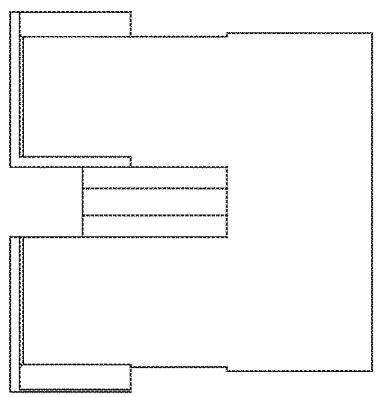
Figure 5C:
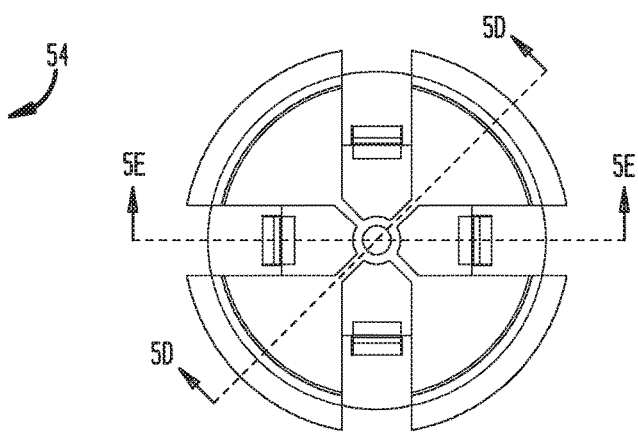
Figure 5D:
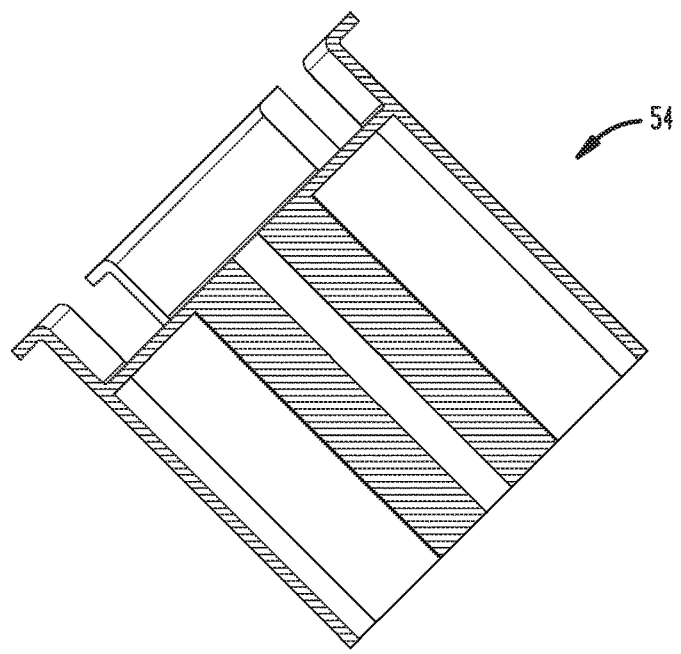
Figure 5E:
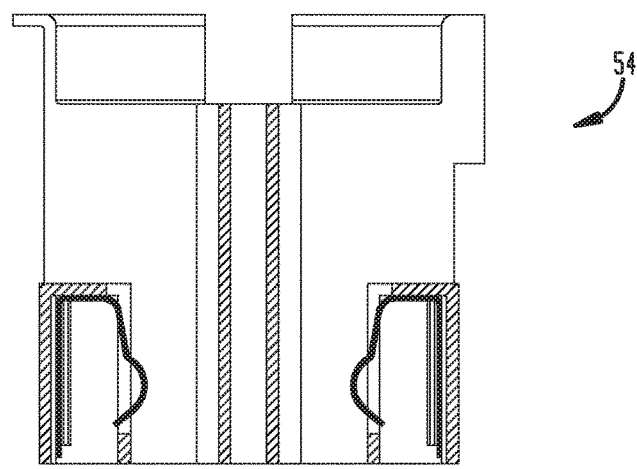
Figure 5F:
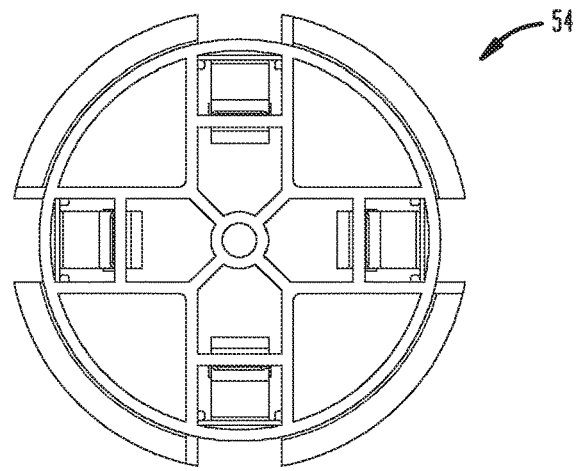
Figure 5G:
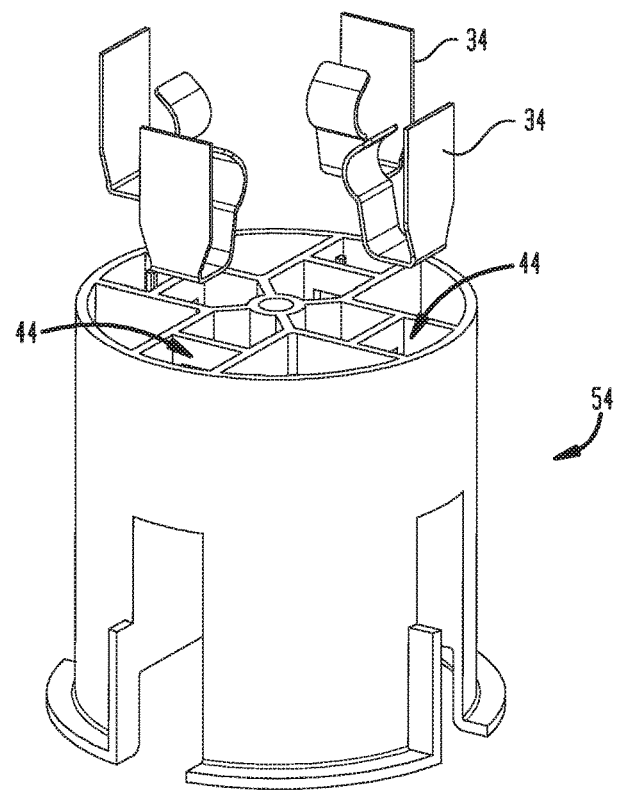
Figure 7A:
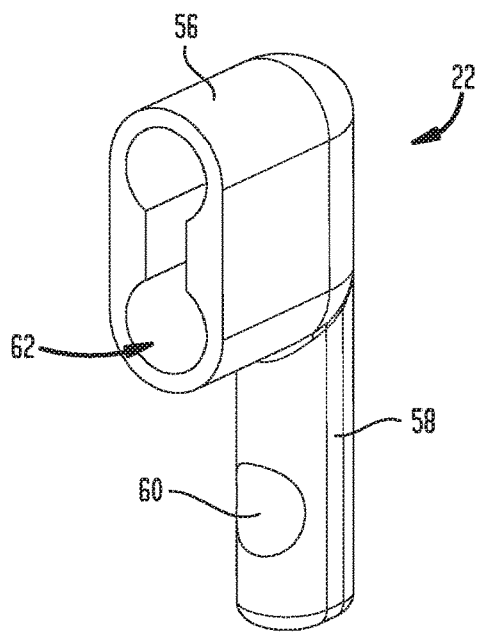
FIGS. 7A, 7B, 7C, 7D, 7E and 7F illustrate details of a spoke end cap.
Figure 7B:
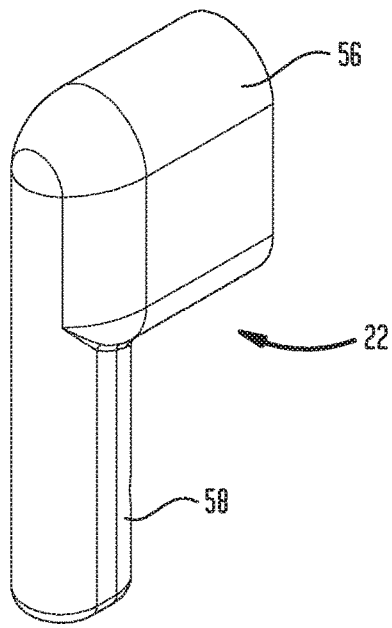
Figure 7C:
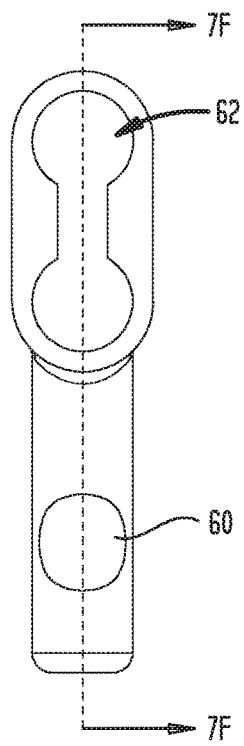
Figure 7D:
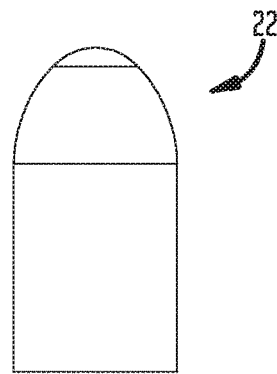
Figure 7E:
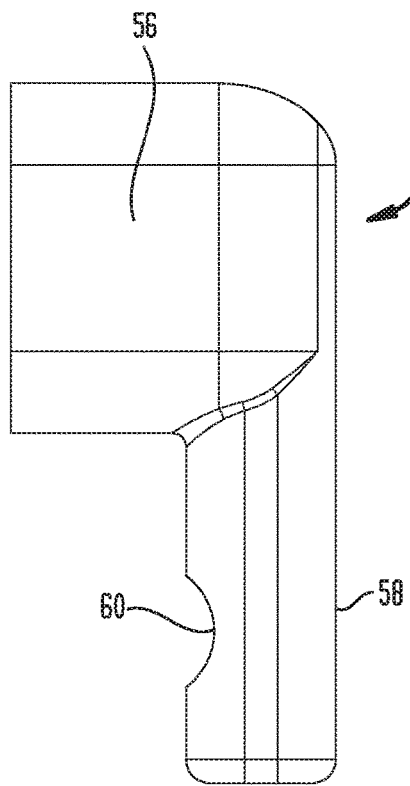
Figure 7F:
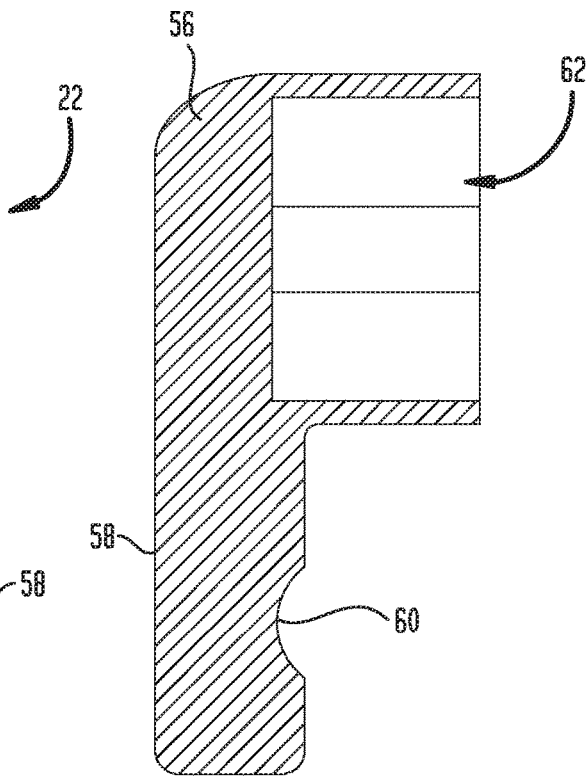
Figure 10A:
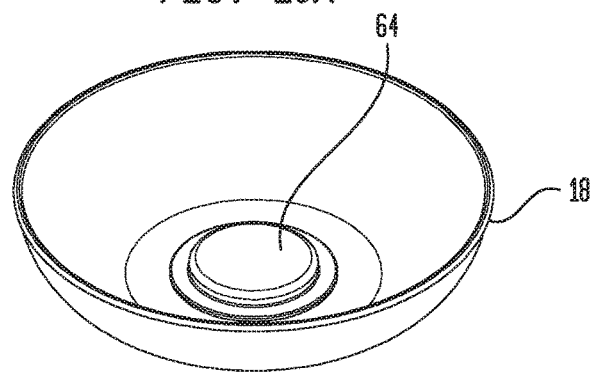
FIGS. 10A, 10B, 10C, 10D, 10E and 10F illustrates the decorative element support bowl prior to the attachment of the float chamber cap 82.
Figure 10B:
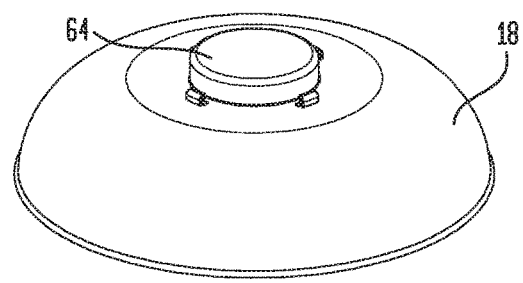
Figure 10C:
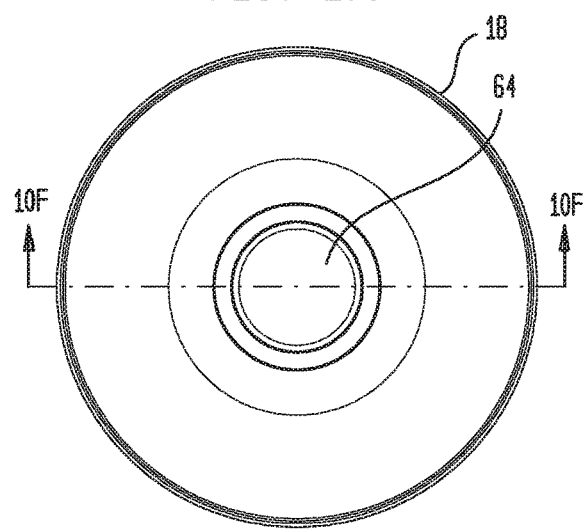
Figure 10D:
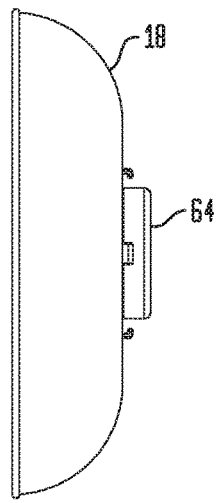
Figure 10E:
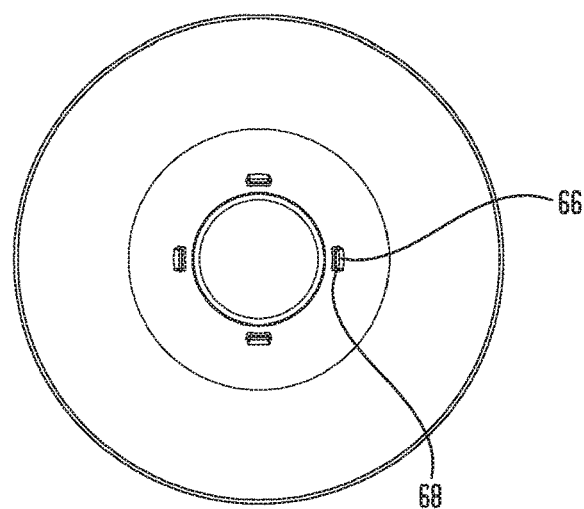
Figure 10F:
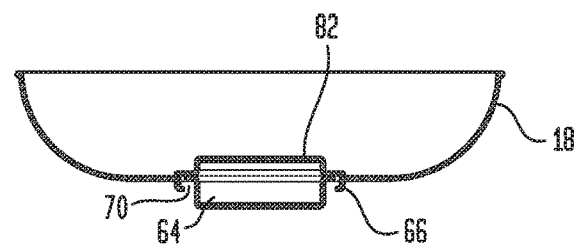
Figure 11A:
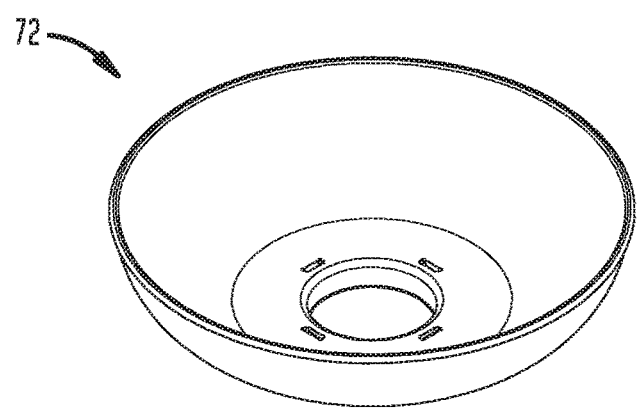
FIGS. 11A, 11B, 11C, 11D and 11E illustrate another embodiment of the decorative bowl in which the bottom of the float is formed by the bottom of the bowl.
Figure 11B:
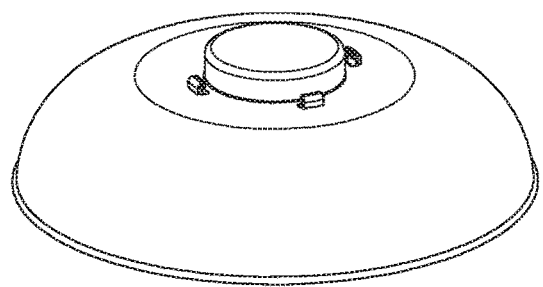
Figure 11C:
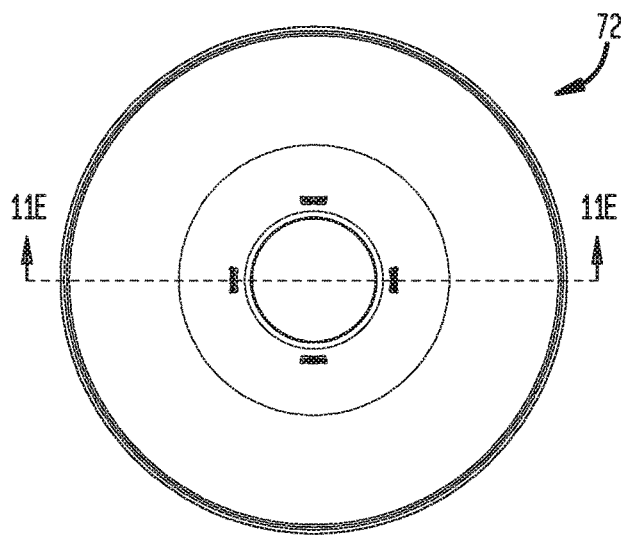
Figure 11D:
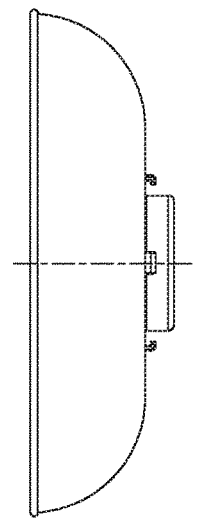
Figure 11E:
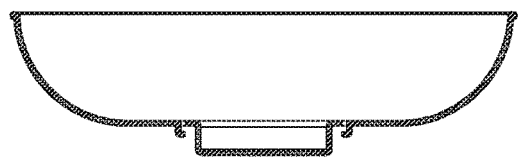

FIGS. 3A-3E illustrate details of the six pocket hub 12 and further indicating how the spoke retention spring clips 34 are inserted into and permanently attached in each of the hub pocket 44. Each hub 12 includes a top side 24, a base 26, a sidewall 28 and a hollow central aperture 30. Six slots 32 are located evenly spaced around the sidewall 28. Six springy clips 34, described in detail in FIGS. 17A-17E, are insertable in the pockets 44 as seen in FIGS. 3E and 3D. The clips 34 include a flat first arm section 36, a flat bottom section 38 and a second opposing arm section 40. Second arm section 40 includes a convex bump 42 that selectively engages the detent 60 on the spoke end cap 22 shown in further detail in FIGS. 7A-7F. Each of the pockets 44 includes an aperture 46 for framing the protruding bump 42 which in turn is engages with the detent 60 on the end cap 22. The top 24 of the hub 12 includes a circumferential flat flange portion 48 and a downward side panel 50 that depends therefrom. The six pockets 44 on the hub 12 are spaces 60 degrees apart and, accordingly, can be used to form triangular grid frameworks as shown in FIGS. 1A-1C or the circular framework of FIGS. 2A-2C.

FIGS. 4A-4C illustrate a square grid framework 52 which can be formed with hubs 54 which only have four pockets or slots 54. Details of a four pocket hub 54 are shown in FIGS. 5A-5F. It is similar in construction to the six pocket hub 12 except that it has only four pockets 44 evenly spaced 90 degrees apart.

FIGS. 6A and 6B illustrates the manner in which the spoke ends 22 slides into slots 32 then engage the retention spring 34 in the pockets 44 of a four pocket hub 52. As shown in FIGS. 7A-7F each spoke end cap 22 includes a top, head section 56, a pin-like portion 58 and a concave detent 60 for selectively engaging the bump 42 on the retention spring 34. A spoke receiving pocket 62 is located in the head 56 of the spoke end cap 22. Downward pressure on the end cap head 56, as seen in FIG. 6A, forces the pin section 58 into the pocket 32 until the pin 58 is completely inserted into the pocket 32 and is held in that position by the engagement of convex bump 42 with concave detent 60. Disassembly is accomplished by pulling up on the spoke cap head 56 until the force is sufficient to case the bump 42 to disengage from the detent 60.

FIGS. 8A-8C illustrates how a decorative element support bowl is attached to a hub 54 and how the spokes 14 radiate from the hub 54. Also shown is a bowl 18 including a float chamber 64 located in the center of the bowl. The bowl 18 also locks the spoke ends 22 in position in pockets 32 of hubs 54. The basic frame including the hub 54 and spokes 14 are intended to remain just below the waterline and are not readily seen. The float chamber 64 located in the center of the bowl 18 and in conjunction with the buoyancy of the bowl 18 itself causes the apparatus to float in such a manner that only the bowl 18 is visible above the waterline.

FIGS. 9A-9C illustrate the hub 54 and spoke frame arrangement of FIGS. 8A-8C with the decorative bowl 18 replaced by a separate float element 65 visible above the hub. There are circumstances where it may be desirable not to have a decorative element support bowl 18 at a hub node but need to have the rest of the framework in place and in a balanced position just below the waterline. In this embodiment the float 65 alone locks the end caps 22 in position in pockets 32 of hub 54.

FIGS. 10A-10F illustrates details of a bowl subassembly 18 having a chamber 64 located in the center thereof and also illustrates the location of four dogleg tabs 66 for engaging via rotating motion the circumferential flat flange portions 48 of the four spoke hub 54.

FIGS. 11A-11E illustrates another embodiment of the decorative bowl 72 in which the bottom of the float is formed by the bottom of the bowl 18.

FIGS. 12A-12F show different views of a float subassembly 65. Float 65 includes dogleg tabs 66 for engaging that flange portions 48 of the four spoke hub 54.

Figure 12A:
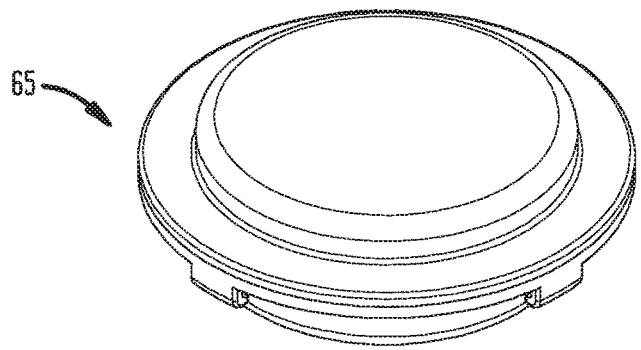
FIGS. 12A, 12B, 12C, 12D, 12E and 12F show different views of a float subassembly.
Figure 12B:
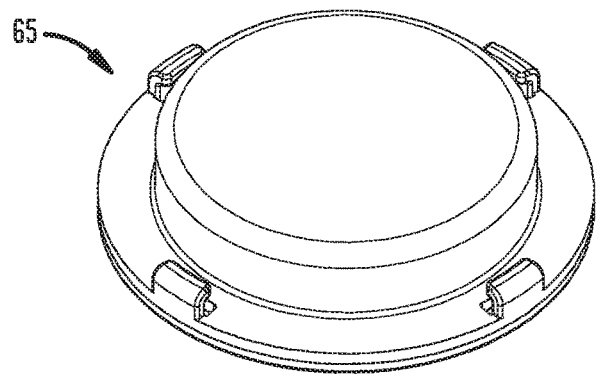
Figure 12C:
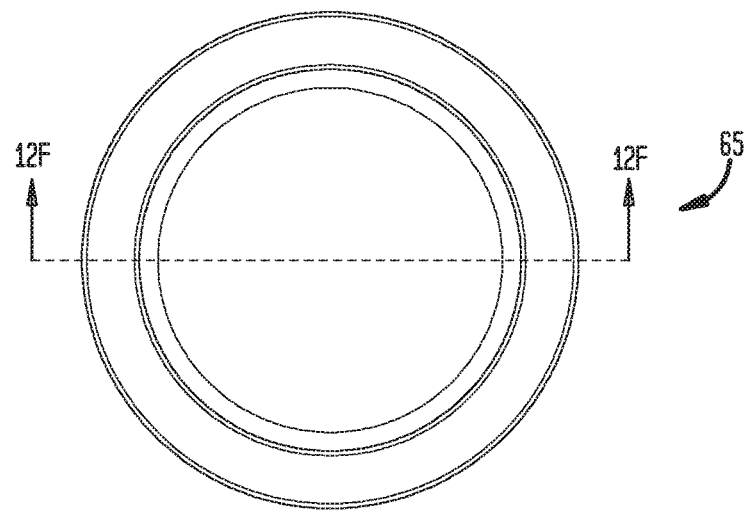
Figure 12D:
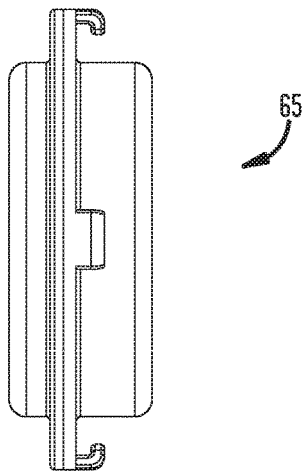
Figure 12E:
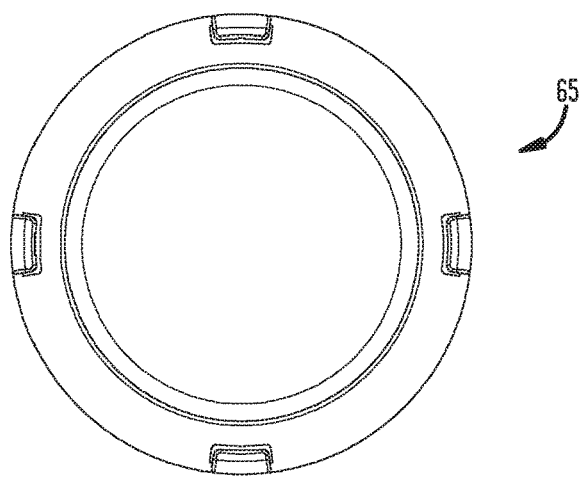
Figure 12F:
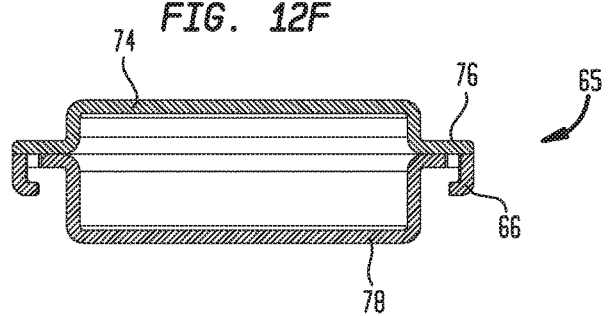
Figure 13A:
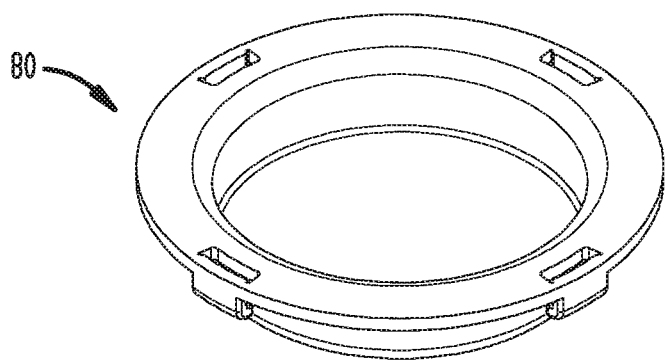
Figure 13B:
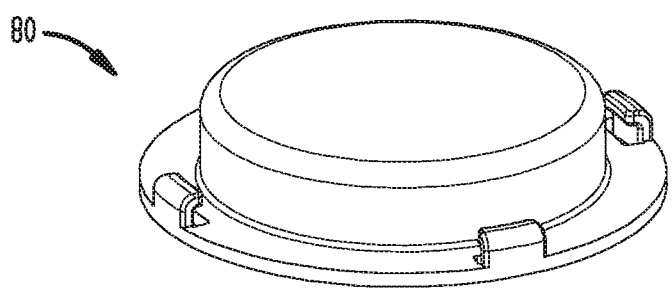
Figure 14A:
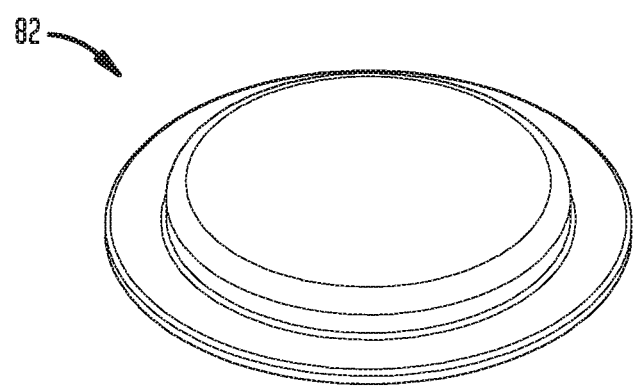
FIGS. 14A, 14B, 14C, 14D and 14E show different views of a float top.
Figure 14B:
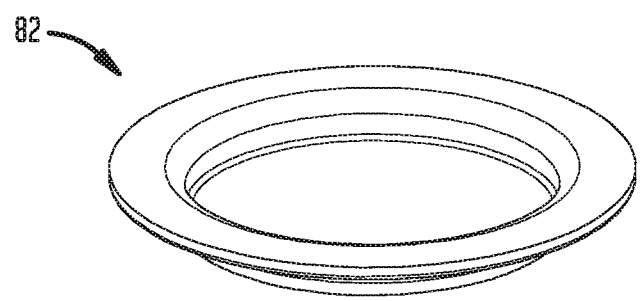
Figure 14C:
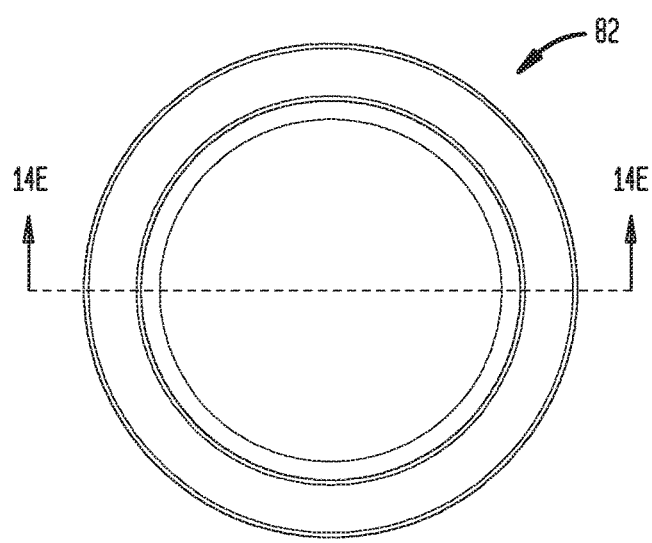
Figure 14D:
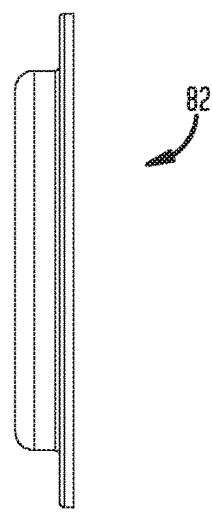
Figure 14E:
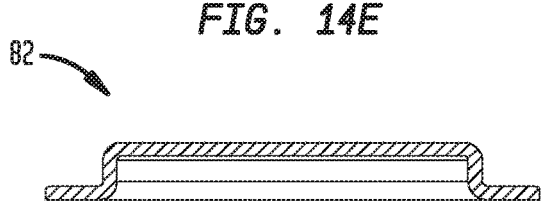
Figure 17A:
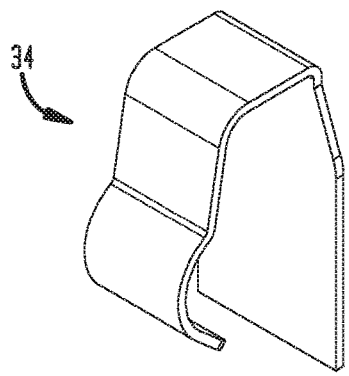
FIGS. 17A, 17B, 17C, 17D and 17E illustrate the U-shaped retention leaf spring including the convex bump which is received in each of the hub pockets and which hold the end caps of the spokes in position.
Figure 17B:
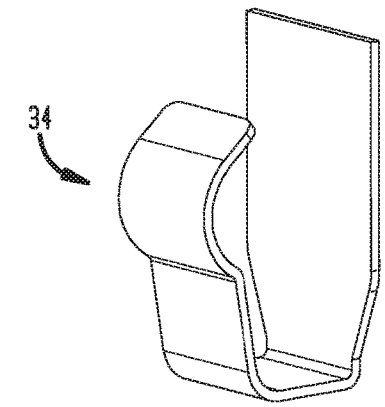
Figure 17C:
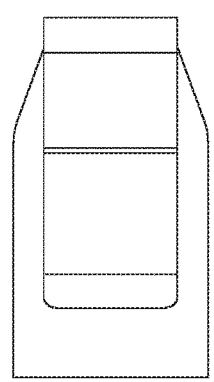
Figure 17D:
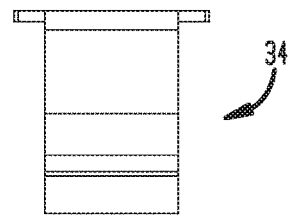
Figure 17E:
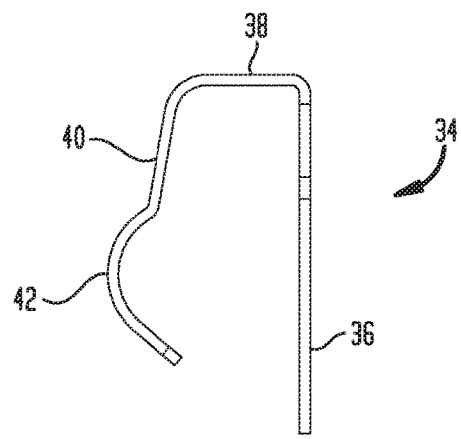
Figure 18B:
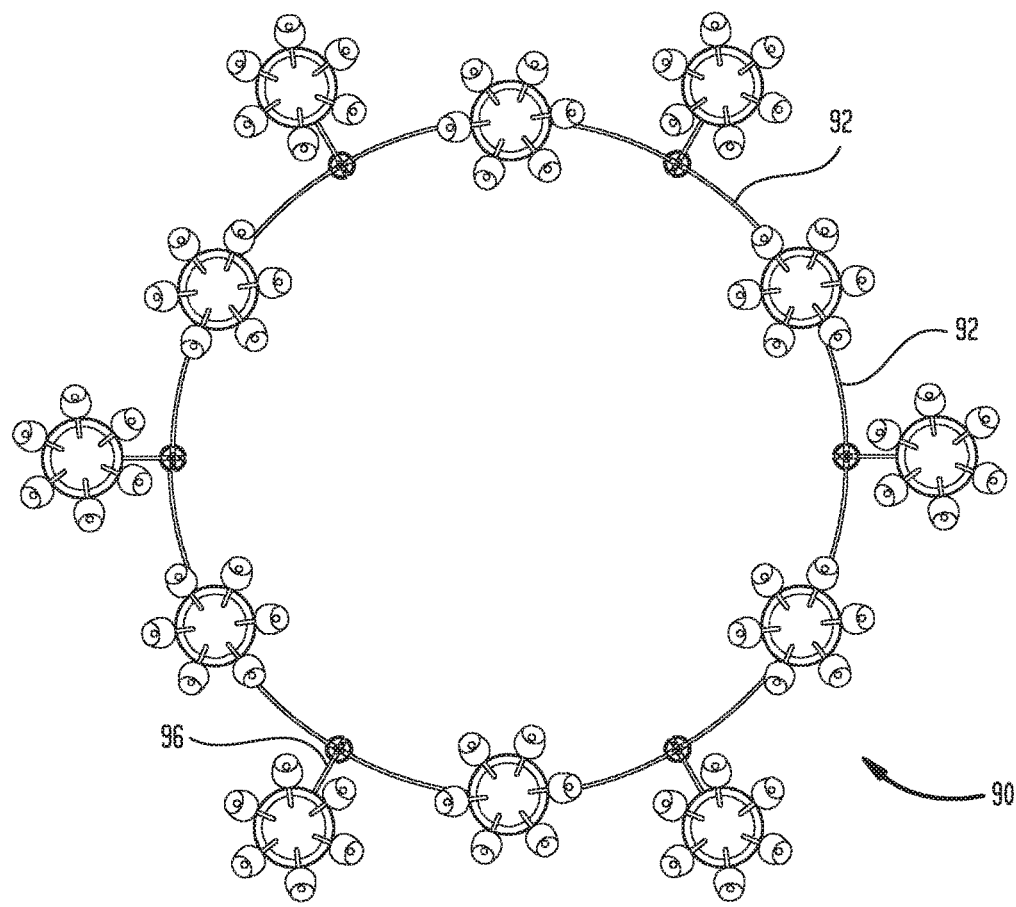
Figure 18C:
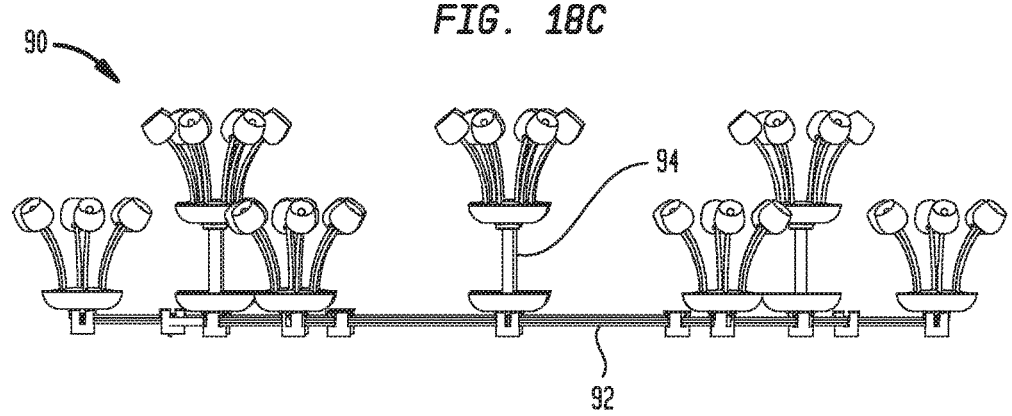
Figure 21A:
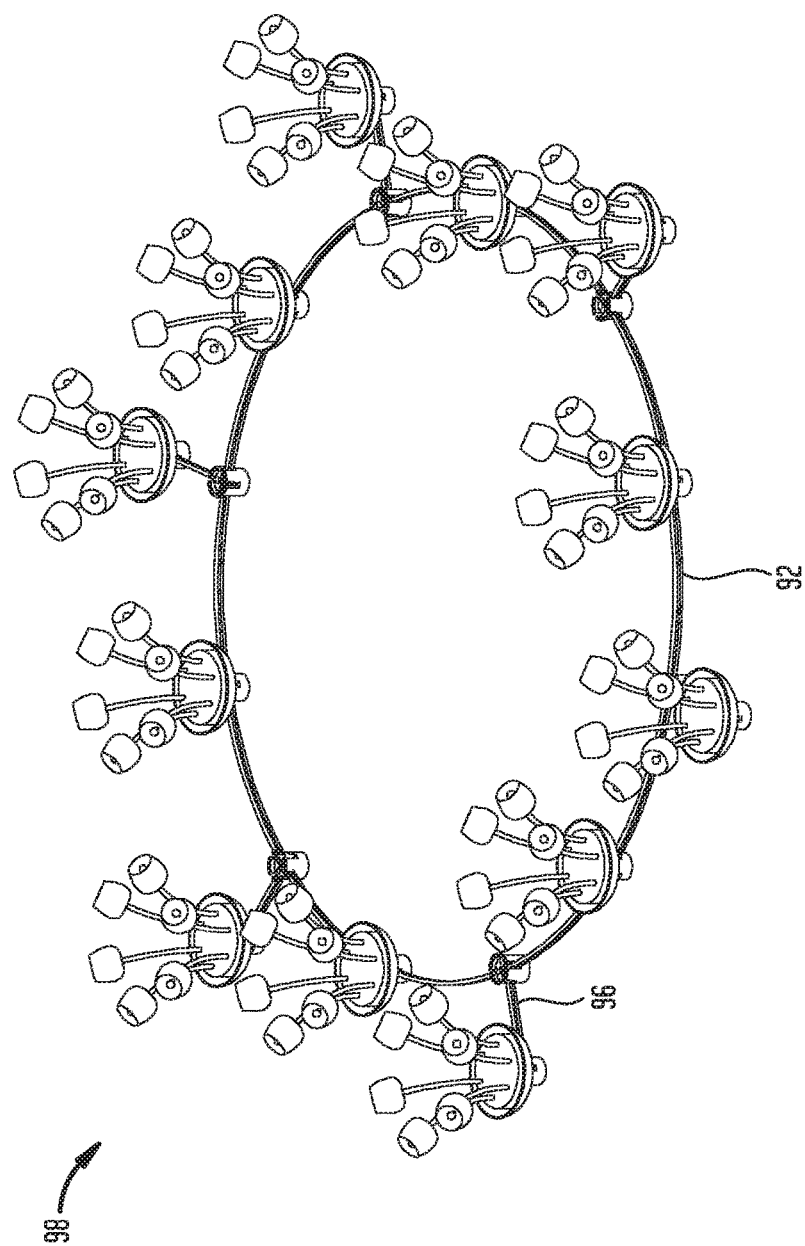
FIGS. 21A, 21B and 21C illustrate an alternative framework employing only horizontal extenders so that all decorative elements live essentially in the same horizontal plane.
Figure 21B:
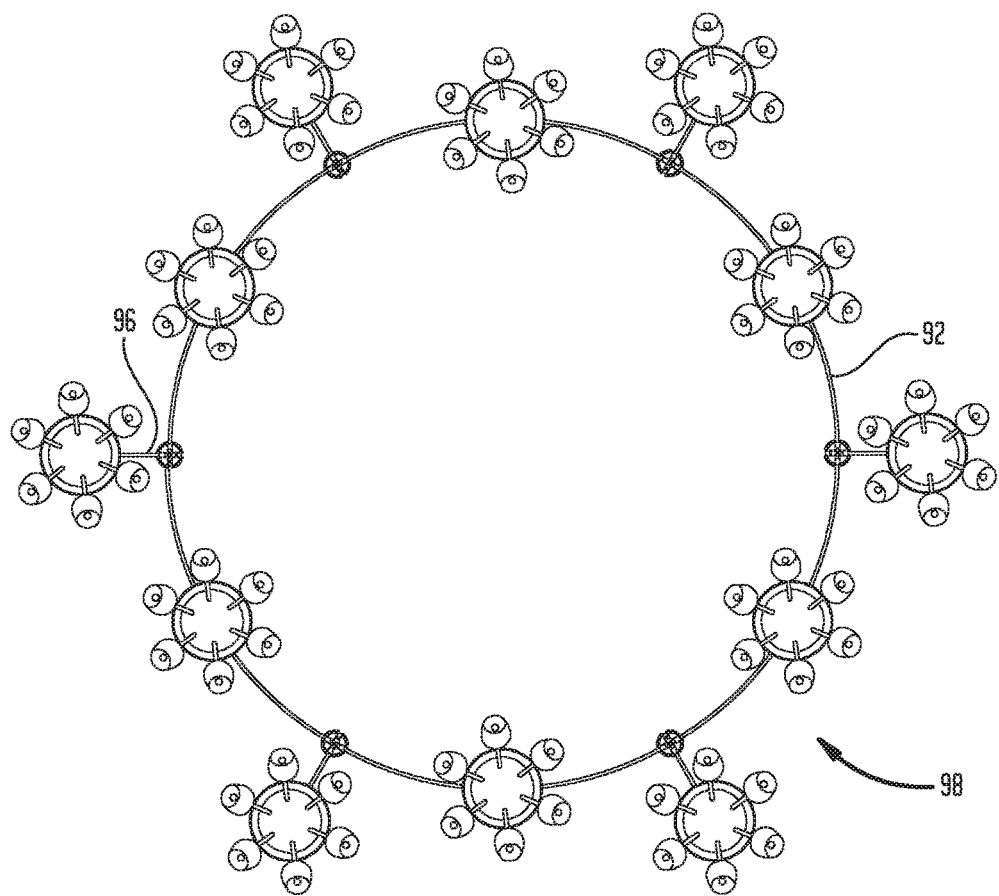
Figure 21C:
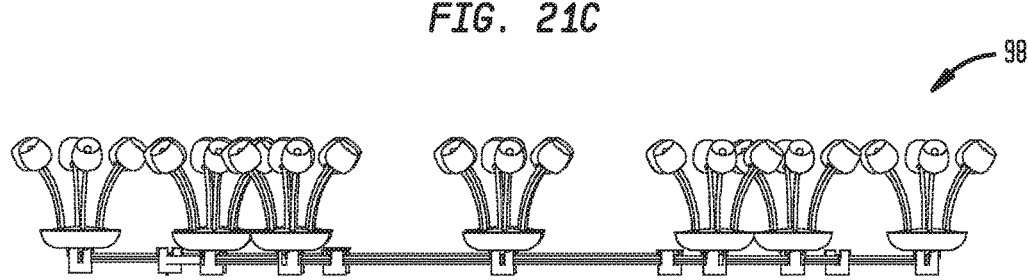

FIGS. 13A-13E illustrates the base 80 of a float and FIGS. 14A-14E illustrate the top 82 which mates with base 80 to form float 65 shown in FIG. 12F. The top 82 of the independent, standalone float 65 is also the same as the top 82 of the float chamber 64 in bowl 18 and can be welded or bonded by conventional means to base 80 or the bottom of bowl 18. The seal or bond is hermetic so the bowl 18 does sink or fill with water from below.

It is clear from the above that the float can either be stand alone and separate as in embodiment 65 or can be integrated into the structure of the bowl 18 itself where the bottom 64 of the bowl 72 forms the bottom of the integrated float as seen in FIGS. 11A-11E.

A typical straight spoke 14 is shown in FIGS. 15A-15C. Spoke 14 has an hour glass-like shape and includes a top rib 84, and intermediate connecting section 86 and a bottom rib 88. The shape is the inverse of the shape of the opening 62 in the end cap 22 so that the two mate and stay mated due to the force of friction or by means of thermal or adhesive bonding.

FIGS. 16A-16E show a typical spoke 14 with a pair of end caps 22 attached.

As previously described, FIGS. 17A-17E illustrate the U-shaped locking leaf-type retention spring 34 including the convex bump 42 which is received in the hub pockets 44 and hold the end caps 22 of the spokes 14 in properly assembled position.

FIGS. 18A-18C and 21A-21C illustrate a ring embodiment of the invention in which vertical extenders 94 can be used to raise the height of the decorative bowl 18 substantially above the height of the water surface. Horizontal extenders 96 can also be used to extend the framework and the invention in a plane horizontal to the water surface and the plane of the rest of the framework. Curved spokes 92 are used to connect the hubs 54 together to form a relatively smooth ring-like structure. FIGS. 19A-19D illustrate the alternative embodiment in which the spokes 92 are curved and FIGS. 20A-20D illustrate the manner in which the curved spoke 92 of FIGS. 19A-19D engages a four pocket hub 54.

The invention is typically used in the following manner. First, the user determines the size and shape of the framework array and the number and type of decorative items based on the size and shape of body of water and the specific objectives of the display. Second, using the kit of components, the grid is assembled next to the body of water by snapping the spokes 14 into the hubs 12 or hubs 54. Third, the spokes 14 are than locked into place using either a standalone float subassembly 65 or a bowl 18. Fourth, the decorative elements 16 are attached to or contained in the bowls 18. Additional bowls 18 can be attached to the spokes 14 in between hubs 12 if required. As the array is assembled, it can be slid into the water. The array can also be assembled in the water.

If required, additional spokes 14 can be added on the outside of the array in order to locate the decorative elements 16 in bowls 18 away from the edge of the pool or fountain. In an open body of water, anchors can be attached to the array in order to keep it in place.

When no longer in use the decorative array 10, 20, 52, 90 and 98 can easily be removed from the water and disassembled for storage and future use.

The invention has several advantages over the prior art, namely:

A. The grid is formed using plastic materials with a specific gravity greater than 1.0. These materials can be transparent or colored to match the bottom of the pool.

B. The spokes 14 can be formed in various lengths in order to provide maximum flexibility in the configuration of the array. The spokes have end fittings or caps 22 that are permanently attached. These caps 22 enable quick attachment to the hubs 12, 54 in such a way as to stabilize the grid framework during assembly.

C. The spokes 14 snap into the hubs 12, 54 from above and are retained by spring clips 34 pre-assembled into the hubs 12, 54. The spokes 14 are further locked into position when the float subassembly 65 or a bowl 18 is locked into place on the top of the hub 12. The bowls 18 will hold the decorative elements 16 and the floats 65 can be locked into place on top of the hubs 12, 54 where no bowls are required.

D. It is possible to attach bowls 18, with decorative items 16 in them, to the spokes 14 in between the connecting hubs 12.

E. The floats 65 and the bowls 18 provide the buoyancy to keep the grid from sinking too far below the surface of the water.

F. The size and configuration of the grid is quite variable according to the number of hubs 12, 54 and lengths of spokes 14 and 92.

G. Hubs 12 with six (6) evenly spaced slots 32 will produce a hexagonal array. Hubs 54 with four (4) evenly spaced slots 32 to hold spokes 12 will produce a rectangular array.

H. Curved spokes 92 will produce a circular array. The radius of curvature will define the overall size of this array.

I. Vertical extension fittings 94 can be attached to bowls 18 to provide a platform for decorative arrangements at various heights above the surface of the water.

J. Once the array is constructed with the spokes 14, 92 locked into place in the hubs 12, 54 the whole grid can be maneuvered easily. This allows for construction of the grid on land and so it can to be easily slid into the water for final positioning.

K. If required the grid can be easily modified once it has been deployed in the water.

L. The locking mechanism that keeps the elements of the array in place is unique and easy to use. In the case of a bowl 18 and hub 54, the lower protruding portion 64 acts as a pilot to guide into the slotted cylindrical opening 30 after the spoke caps have been inserted into pockets 32 and held in place by springs 34. Once the base of float 64 of bowl 18 is fully seated, the bowl is rotated about 60° so that the dog legged tabs 66 engage the underside of top flange 48 and are held in place by friction and/or the natural springiness of the plastic compartments. Additional security can be obtained by adding a small rib or bump (not shown) to the underside of flange 48 so the tabs 66 don't back out. The locking with a standalone float 65 is accomplished in exactly the same way, namely, the base 80 is inserted in the slotted cylindrical opening 30 and then rotated until the dog legged tabs 66 fully engage the underside of the top flange 48.

While the invention has been described with reference to a preferred embodiment thereof and several alternative embodiments, it will be appreciated by those of ordinary skill in the art that various modifications can be made to the structure and form of the invention without departing from the spirit and scope of the invention as a whole.

What is claimed is:

1. A floating apparatus for supporting decorative elements in water comprising: a hub; at least two spokes attached to said hub; a float attached to said hub; and a decorative element holder attached to said hub, wherein: said decorative element holder is positioned above the hub when the floating apparatus is in an upright position; the float is located in the decorative element holder; and the decorative element holder and the float are configured to have a combined buoyancy sufficient to cause at least a portion of the decorative element to float above a surface of the water while the hub and the spokes remain at least partially submerged in the water.

2. The apparatus of claim 1 further comprising: at least two spoke end caps attached to respective ends of the at least two spokes, each of said spoke end caps further including a pin portion for engagement with said hub.

3. The apparatus of claim 2 wherein said hub has a plurality of pockets formed therein and each of said pin portions on the spoke end caps is receivable in a respective one of said pockets in said hub.

4. The apparatus of claim 3 further comprising: at least two clips each having a first and a second arm and a bottom section attached to the first and second arms, and wherein one of said first and second arms has a convex bump thereon, wherein said clips are receivable the pockets in said hub.

5. The apparatus of claim 4 wherein each of said pin portions on said spoke end caps includes a concave detent thereon, wherein when said pin portions are pushed into said pockets in said hub said convex bumps engage the detents on said pin portions and hold said spokes firmly to said hub.

6. The apparatus of claim 5 wherein said hub has at least three pockets therein for attachment to said pin portions on said spoke end caps.

7. The apparatus of claim 6 wherein said apparatus comprises a plurality of hubs, floats and spokes and can be selectively arranged in a repeating pattern.

8. The apparatus of claim 7 wherein said decorative element holder comprises a bowl for supporting a decorative item, said bowl also having a bottom and a sidewall, wherein a float chamber is located in the symmetrical center of the bottom of said bowl.

9. The apparatus of claim 8 further comprising an optional vertical arm attachable to said hub and wherein said vertical arm supports another decorative element holder substantially above the level of the water.

10. The apparatus of claim 8 comprising an optional horizontal arm attachable to said apparatus for attaching one decorative element holder to said apparatus in a plane parallel to the surface of said water.

11. The apparatus of claim 8 wherein said spokes are substantially straight.

12. The apparatus of claim 8 wherein at least two of said spokes are curved.

13. The apparatus of claim 8 wherein said apparatus is in the form of a grid and said hubs are located at node points of said grid.

14. The apparatus of claim 8 wherein said apparatus is in the form of a circle.

15. The apparatus of claim 8 wherein said apparatus came be assembled for use and disassembled and stored after use.

16. The apparatus of claim 8 wherein said float includes a top, a bottom and a plurality of hub engagement tabs, and further wherein said hub includes a flange for engaging said hub engagement tabs, wherein when said float is inserted in said hub and rotated said hub engagement tabs engage said hub flange and hold the apparatus together.

17. The apparatus of claim 8 wherein said bowl includes a plurality of dog legged tabs and said hub included at least one flange, wherein when the base of the said bowl is placed in said hub and rotated the tabs engage said flange and hold the elements of said apparatus together.

18. The apparatus of claim 8 wherein said bowl is configured to cover the pockets of the hub and thereby lock said spoke end caps in position in said pockets of said hub.

19. The apparatus of claim 7 wherein at least one float locks said spoke end caps in position in said pockets of said hub.

20. A floating apparatus for supporting decorative elements in water comprising:
   a hub having a plurality of pockets formed therein;
   at least two spokes attached to the hub;
   a float attached to the hub;
   a decorative element holder attached to the hub;
   at least two spoke end caps attached to respective ends of the at least two spokes, each of the spoke end caps including a pin portion having a concave detent thereon and configured to be received in a respective one of the pockets; and
   at least two clips each having a first and a second arm and a bottom section attached to the first and second arms; wherein one of the first and second arms has a convex bump thereon and is configured to be received in a respective one of the pockets so that when the pin portions on the spoke end caps are pushed into the respective pockets the convex bumps engage the detents and hold the spokes firmly to the hub.

* * * * *